(12) United States Patent
Anghileri

(10) Patent No.: US 12,441,077 B2
(45) Date of Patent: Oct. 14, 2025

(54) APPARATUS AND METHOD FOR MANUFACTURING PAPER STRAWS

(71) Applicant: NOVACART S.P.A., Garbagnate Monastero (IT)

(72) Inventor: Gianmario Anghileri, Malgrate (IT)

(73) Assignee: NOVACART S.p.A., Garbagnate Monastero (IT)

( * ) Notice: Subject to any disclaimer, the term of this patent is extended or adjusted under 35 U.S.C. 154(b) by 148 days.

(21) Appl. No.: 18/575,090

(22) PCT Filed: Jul. 18, 2022

(86) PCT No.: PCT/IB2022/056583
§ 371 (c)(1),
(2) Date: Dec. 28, 2023

(87) PCT Pub. No.: WO2023/286035
PCT Pub. Date: Jan. 19, 2023

(65) Prior Publication Data
US 2024/0300203 A1    Sep. 12, 2024

(30) Foreign Application Priority Data

Jul. 16, 2021   (IT) .................. 102021000018896

(51) Int. Cl.
*B31D 5/00*   (2017.01)
(52) U.S. Cl.
CPC .................. *B31D 5/0095* (2013.01)
(58) Field of Classification Search
CPC ....... B31F 1/0045; B31F 7/004; B31D 5/0095
See application file for complete search history.

(56) References Cited

U.S. PATENT DOCUMENTS 540,691 A * 6/1895 Ruete ............... B29C 63/30
                                                        138/141
2021/0114327 A1* 4/2021 Huang ............ B31F 1/0045

FOREIGN PATENT DOCUMENTS

GB         2171168 A        8/1986
KR     20200047393 A        5/2020
WO   WO-2021132751 A1 *    7/2021  ........... B31D 5/02

OTHER PUBLICATIONS

Translation of WO 2021132751 A1 (Year: 2021).*

(Continued)

*Primary Examiner* — Thomas M Wittenschlaeger
(74) *Attorney, Agent, or Firm* — MH2 TECHNOLOGY LAW GROUP LLP

(57) ABSTRACT

Apparatus for making straws comprising a support structure defining an internal volume and carrying a feeding station configured to feed a strip or at least one discrete sheet of paper material, and a forming station comprising a base, a first side wall and a second side wall converging with each other. The conveyor is configured to receive the strip in a substantially flat form at the infeed portion and wind it around the winding axis to define a cylindrical body made of paper material, wherein the first end portion and the second end portion are facing each other and overlapping to define a mutually overlapping portion. The apparatus further comprises a winding body passing through a conveyor passage opening, and a constraining station configured to constrain the first end portion with the second end portion to define a straw.

21 Claims, 9 Drawing Sheets

(56) References Cited

OTHER PUBLICATIONS

International Search Report and Written Opinion dated Dec. 20, 2022 in corresponding International Application No. PCT/IB2022/056583, 18 pages.

\* cited by examiner

APPARATUS AND METHOD FOR MANUFACTURING PAPER STRAWS

CROSS-REFERENCE TO RELATED APPLICATIONS

This application is a U.S. National Stage application of PCT/IB2022/056583, filed Jul. 18, 2022, pending, which claims priority to Italian Patent Application No. 102021000018896, filed Jul. 16, 2021, the entire disclosures of which are hereby incorporated by reference in their entireties.

FIELD OF THE INVENTION

The present invention relates to a method and apparatus for manufacturing paper straws. In more detail, the invention relates to a small table-top machine for making paper straws and a production method thereof. The invention thus finds application in the catering, food and beverage sector.

STATE OF THE ART

Industrial apparatus for making paper straws are known in food and beverage industry, in which a paper strip, unwound from a reel, is wound several times in a spiral direction around a central body, defining a straw.

Patent document TWM543012U describes a system for making straws from paper material, in which a ribbon is repeatedly wound around a central core to define a paper cylinder with a spiral structure. The end portions of the edges of the coiled ribbon are mutually overlapped in such a way as to allow them to engage each other by a heat welding process. The production method and apparatus allow high productivity and are intended for the production of large quantities of straws for industrial applications.

The Applicant points out that the method of making spiral straws envisages a large piece of apparatus, suitable for industrial environments but unsuitable for use in public spaces, such as restaurants or private premises. The Applicant also points out that this method provides for continuous operation of the apparatus, making it suitable for use in areas where high productivity is required: this method and apparatus is therefore not suitable for making individual straws at the Customer's request.

Apparatus for the production of straws by means of spiral winding involves the continuous overlapping of the lateral portions of the strip. This leads, on the one hand, to a considerable consumption of material and, on the other hand, to the adoption of real production machines in order to be able to increase the hourly productivity and consequently reduce the unit price of the product for subsequent marketing. This leads both to an increase in necessary material consumption and the need for high productivity in the face of high sales volumes.

Document KR20200047393A discloses an apparatus and method for making paper straws by means of a tapered profile element. The tapered profile element extends from an open semi-circular portion, configured to receive the paper strip, to an outlet end: the paper wraps around a central core as it passes through the tapered profile element.

OBJECTIVES OF THE INVENTION

The purpose of the present invention is substantially to solve at least one of the above-mentioned drawbacks and/or limitations.

A first objective of the present invention is to provide a suitable method and apparatus for the production of a limited number of paper straws, in particular for the production of individual straws at each customer request.

A further objective of the invention is to provide a method and apparatus to reduce material consumption during the manufacturing cycle of each straw.

A further objective of the invention is to provide a method and apparatus that is flexible enough to allow the production of individual straws with different dimensions, as required by the customer.

A further objective of the invention is to provide an apparatus for making paper straws that is compact in size and light in weight, particularly one that is easily transportable by hand.

It is also an objective to provide a device whose initial purchase cost is low, where the cost of the straw will be inexpensive, and above all guarantee hygiene with uncontaminated straws.

A further objective is to provide a device and a method for making straws able to reduce speed variations of the paper material during its advancement along the apparatus.

A further objective is to provide a device and a method for making straws wherein the paper web moves smoothly from the apparatus entrance up to the apparatus outlet.

Another objective is to intrigue and interest the hypothetical customer in an instructive way.

A further scope of the invention is to provide a device, for making paper straws, which can be easily operated by a user subject (e.g., directly by a customer of the catering establishment) who is not skilled in the field of straw making.

BRIEF DESCRIPTION OF THE DESIGNS

Certain embodiments and aspects of the invention will be described herein with reference to the accompanying drawings, which are provided for illustrative purposes only and are therefore not exhaustive:

CONVENTIONS

Figure 1:
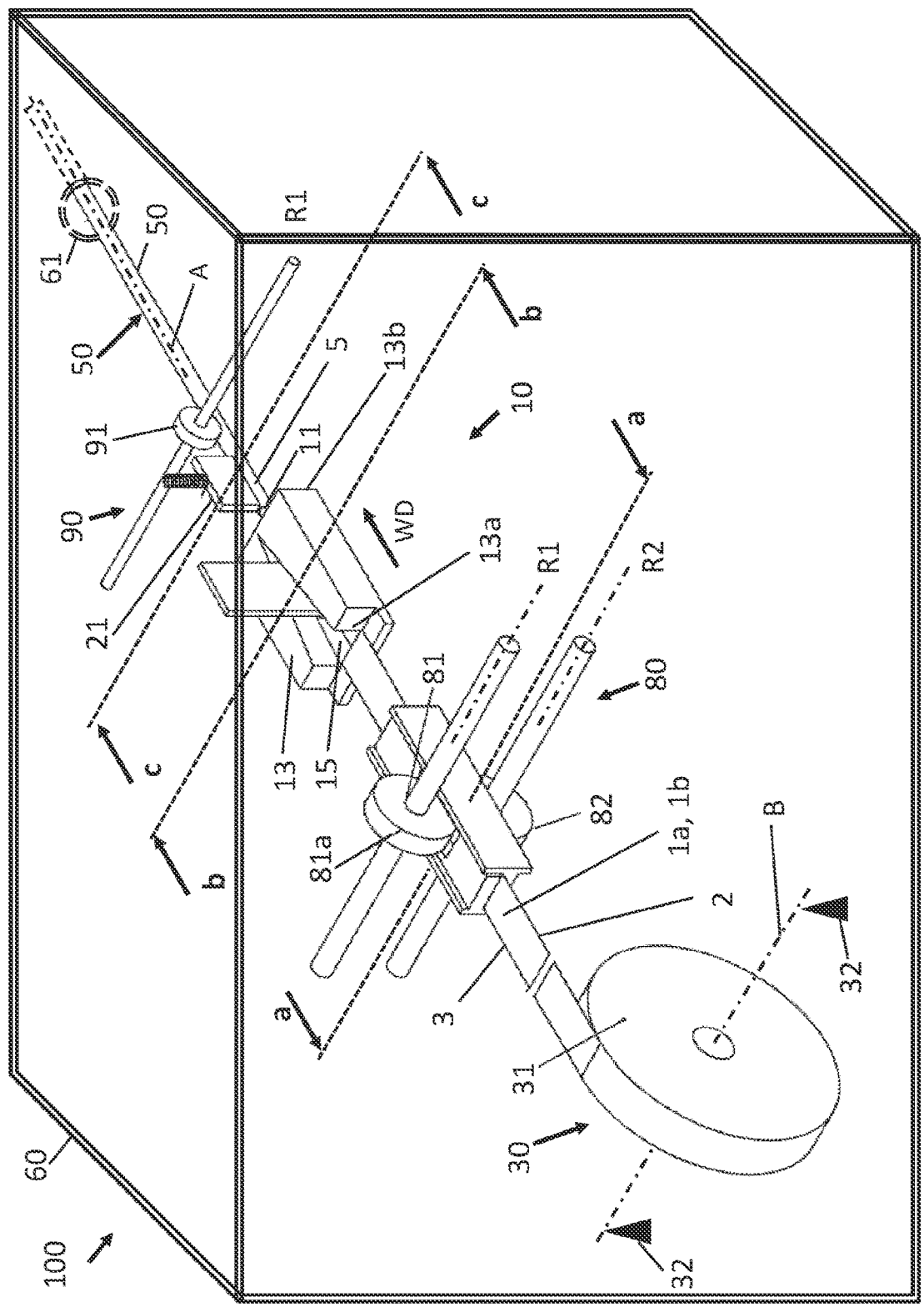
FIG. 1 is a perspective view of an apparatus according to the present invention for making straws.

Note that in the present detailed description corresponding parts illustrated in the various figures are indicated by the same numerical references. The figures may illustrate the subject-matter of the invention by means of non-scaled representations; therefore, parts and components illustrated in the figures relating to the subject-matter of the invention may relate only to schematic representations.

Definitions

Control Units

The apparatus described and claimed herein comprises at least one control unit for controlling the operations performed by the apparatus. The control unit may evidently be a single control unit or comprise a plurality of distinct control units depending on design choices and operational requirements.

The term control unit is understood to mean an electronic type component which may comprise at least one of: a digital processor (e.g. comprising at least one selected from among: CPU, GPU, GPGPU), a memory (or memories), an analogue type circuit, or a combination of one or more digital processing units with one or more analogue type circuits. The control unit can be 'configured' or 'programmed' to perform certain steps: this can be achieved in practice by any means that allows the control unit to be configured or programmed. For example, in the case of a control unit comprising one or more CPUs and one or more memories, one or more programs may be stored in appropriate memory banks attached to the CPU(s); the program(s) contain instructions which, when executed by the CPU(s), program or configure the control unit to perform the operations described in relation to the control unit. Alternatively, if the control unit is or comprises analogue type circuitry, then the circuitry of the control unit may be designed to include circuitry configured, in use, to process electrical signals to perform the steps related to the control unit. The control unit may comprise one or more digital units, e.g. of the microprocessor type, or one or more analogue units, or an appropriate combination of digital and analogue units; the control unit may be configured to coordinate all actions necessary to execute an instruction and sets of instructions.

Motor

The term motor refers to any device capable of causing a movement on a body, e.g. upon command from the control unit (reception by the motor of a command sent by the control unit). The motor may be an electric motor, DC or AC, with power, speed and torque characteristics depending on the design requirements. The motor may define a rotary motion and may include a gearbox, for example consisting of one or more gears connected to each other: the gearbox may be a speed reducer, in order to increase the output motor torque. The motor may also define a linear or rectilinear movement on a body.

The motor can also be driven by means of a spring, e.g. a torsion spring, which may be preloaded.

Actuator

The term actuator refers to any device capable of causing a movement on a body, e.g. upon command from the control unit (reception by the actuator of a command sent by the control unit). The actuator may be electric, pneumatic, mechanical (e.g. spring), or other types. The actuator may define a linear, rectilinear or circular motion. The actuator may also include a gearbox, e.g. consisting of one or more interconnected gears: the gearbox may be a speed reducer, in order to increase the output motor torque.

SUMMARY SECTION

A 1st aspect refers to an apparatus (100) for making straws comprising a support structure (60), defining an internal volume bearing:
- a feeding station (30) configured to feed a strip (1a) or at least one discrete sheet (1b) of paper material along one feeding direction, said strip or discrete sheet extending:
  - in length along a first direction substantially parallel to or coinciding with that supply direction, and
  - in width along a second direction orthogonal to said first direction between a first end portion (2) and a second end portion (3),
- a constraining station (10) comprising:
- a conveyor (13) extending in length, along a winding axis, between an inlet portion (13a) configured to receive the strip (1a) or the discrete sheet (1b) and an outlet portion (13b) configured to allow transit of the strip (1a) or discrete sheet (1b) exiting said conveyor (13), said winding axis defining a winding direction (WD) from the inlet portion (13a) to the outlet portion (13b) of the conveyor (13), 10
  - said conveyor (13) further comprising:
  - a base (15) extending between the inlet portion (13a) and the outlet portion (13b) of the conveyor (13), said base (15) being configured to receive the strip (1a) or the discrete sheet (1b) in support;
  - a first and second side wall (16, 17) extending in height from said base (15), said first and second side wall (16, 17) converging with each other along said winding direction (WD);
  - a through opening (14) located at the outlet portion (13b) of the conveyor (13), said through opening (14) defining a passage section interposed laterally between the first and second side walls (16, 17), and interposed vertically between said base (15) and a top wall (18) opposite said base (15);
  - in which said conveyor (13) is configured for:
  - receive the strip (1a) or the discrete sheet (1b) in substantially flat form at the entry portion (13a), and
  - winding said strip (1a) or discrete sheet (1b) around said winding axis to define a cylindrical body (5) of paper material, in which the first end portion (2) and the second end portion (3) are facing each other and overlapping to define a mutual overlapping portion (4) at least at the outlet portion (13b),
- a winding body (11) extending along a main axis (A) substantially parallel to or coinciding with said winding axis and configured to receive in winding said cylindrical body (5), said winding body (11) passing through said conveyor passage opening (13);

a constraining station (20) configured to constrain the first end portion (2) with the second end portion (3) at the mutual overlapping portion (4) to define a straw (50) extending between a first and second free edges (51, 52) that are substantially circular.

A 2nd aspect relates to an apparatus (100) for making straws comprising a support structure (60), defining an internal volume bearing:

a feeding station (30) configured to feed a strip (1a) or at least one discrete sheet (1b) of paper material along one feeding direction, said strip or discrete sheet extending:

in length along a first direction substantially parallel to or coinciding with that supply direction, and in width along a second direction orthogonal to said first direction between a first end portion (2) and a second end portion (3), a constraining station (10) comprising:

a conveyor (13) extending in length, along a winding axis, between an inlet portion (13a) configured to receive the strip (1a) or the discrete sheet (1b) and an outlet portion (13b) configured to allow transit of the strip (1a) or discrete sheet (1b) exiting said conveyor (13), said winding axis defining a winding direction (WD) from the inlet portion (13a) to the outlet portion (13b) of the conveyor (13), said conveyor (13) comprising one or more side walls (15, 16, 17) defining an internal through-conveyor volume laterally limited by said one or more side walls of said conveyor and configured to receive the sheet material in passage, said conveyor (13) further comprising an access opening to said internal through-conveyor volume and an exit opening from said internal through-conveyor volume, in which said access port has a first radial dimension of access, and in which said exit port has a second radial dimension of exit, said first radial dimension of access being greater than said second radial dimension of access, said outlet port defining a through opening (14) located at the outlet portion (13b) of the conveyor (13), said through opening (14) defining a substantially closed passage section;

in which said conveyor (13) is configured for:

receive the strip (1a) or discrete sheet (1b) in substantially flat form at the entry portion (13a), and wind said strip (1a) or discrete sheet (1b) around said winding axis to define a cylindrical body (5) made of paper material, in which the first end portion (2) and the second end portion (3) are facing each other and overlapping to define a mutual overlapping portion (4) at least at the outlet portion (13b), a winding body (11) extending along a main axis (A) substantially parallel to or coinciding with said winding axis and configured to receive in winding said cylindrical body (5), said winding body (11) passing through said conveyor passage opening (13);

a constraining station (20) configured to constrain the first end portion (2) with the second end portion (3) at the mutual overlapping portion (4) to define a straw (50) extending between a first and second free edges (51, 52) that are substantially circular.

A 3rd aspect relates to an apparatus (100) for making straws comprising a support structure (60) defining an internal volume bearing:

a feeding station (30) configured to feed a strip (1a) or at least one discrete sheet (1b) of paper material along one feeding direction, said strip or discrete sheet extending:

in length along a first direction substantially parallel to or coinciding with that supply direction, and in width along a second direction orthogonal to said first direction between a first end portion (2) and a second end portion (3), a constraining station (10) comprising:

a conveyor (13) extending in length, along a winding axis, between an inlet portion (13a) configured to receive the strip (1a) or the discrete sheet (1b) and an outlet portion (13b) configured to allow transit of the strip (1a) or discrete sheet (1b) exiting said conveyor (13), said winding axis defining a winding direction (WD) from the inlet portion (13a) to the outlet portion (13b) of the conveyor (13), said conveyor (13) comprising one or more side walls (15, 16, 17) defining an internal through-conveyor volume laterally limited by said one or more side walls of said conveyor and configured to receive the sheet material through, said conveyor (13) further comprising an access opening to said internal through-conveyor volume and an exit opening from said internal through-conveyor volume, in which said access opening has a first radial dimension of access, and in which said exit opening has a second radial dimension of exit, said first radial dimension of access being greater than said second radial dimension of exit, in which said conveyor (13) is configured for:

receiving the strip (1a) or discrete sheet (1b) in substantially flat form at the entry portion (13a), and winding said strip (1a) or discrete sheet (1b) around said winding axis to define a cylindrical body (5) of paper material, in which the first end portion (2) and the second end portion (3) are facing each other and overlapping to define a mutual overlapping portion (4) at least at the outlet portion (13b), a winding body (11) extending along a main axis (A) substantially parallel to or coinciding with said winding axis and configured to receive in winding said cylindrical body (5), said winding body (11) passing through said conveyor passage opening (13);

a constraining station (20) configured to constrain the first end portion (2) with the second end portion (3) at the mutual overlapping portion (4) to define a straw (50) extending between a first and second free edges (51, 52) that are substantially circular.

A 4th aspect refers to an apparatus (100) for making straws comprising a support structure (60) defining an internal volume bearing:

a feeding station (30) configured to feed a strip (1a) or at least one discrete sheet (1b) of paper material along one feeding direction, said strip or discrete sheet extending:

in length along a first direction substantially parallel to or coinciding with that supply direction, and in width along a second direction orthogonal to said first direction between a first end portion (2) and a second end portion (3), a constraining station (10) comprising:

a conveyor (13) extending in length, along a winding axis, between an inlet portion (13a) configured to receive the strip (1a) or the discrete sheet (1b) and an outlet portion (13b) configured to allow transit of the strip (1a) or discrete sheet (1b) exiting said conveyor (13), said winding axis defining a winding direction (WD) from the inlet portion (13a) to the outlet portion (13b) of the conveyor (13), in which said conveyor (13) comprises an internal passage volume converging along the winding direction and has a passage opening (14), at the outlet portion (13b), having a radial dimension substantially equal to a desired size of the straw, said radial dimension being between 5 mm and 15 mm, more particularly between 6 mm and 12 mm, more particularly between 7 mm and 10 mm, in which said conveyor (13) is configured for:

receive the strip (1a) or discrete sheet (1b) in substantially flat form at the entry portion (13a), and Winding said strip (1a) or discrete sheet (1b) around said winding axis to define a cylindrical body (5) of paper material, in which the first end portion (2) and the second end portion (3) are facing each other and overlapping to define a mutual overlapping portion (4) at least at the outlet portion (13b), a winding body (11) extending along a main axis (A) substantially parallel to or coinciding with said winding axis and configured to receive in winding said cylindrical body (5), said winding body (11) passing through said conveyor passage opening (13);

a constraining station (20) configured to constrain the first end portion (2) with the second end portion (3) at the mutual overlapping portion (4) to define a straw (50) extending between a first and second free edges (51, 52) that are substantially circular.

In a further independent aspect, there is an apparatus (100) for making straws comprising:

a support structure (60), a feeding station (30) configured to feed a strip (1a) or at least one discrete sheet (1b) of paper material along one feeding direction, said strip or discrete sheet extending:

in length along a first direction substantially parallel to or coinciding with that supply direction, and in width along a second direction orthogonal to said first direction between a first end portion (2) and a second end portion (3), a constraining station (10) comprising:

a conveyor (13) extending in length, along a winding axis, between an infeed portion (13a), configured to receive the belt (1a) or the discrete sheet (1b), and an outfeed portion (13b) configured to allow the belt (1a) or discrete sheet (1b) to pass through said conveyor (13), said winding axis defining a winding direction (WD) from the infeed portion (13a) to the outfeed portion (13b) of said conveyor (13), the belt (1a) or discrete sheet (1b) feeding direction being substantially parallel to the winding direction (WD), said conveyor (13) further comprising:

a base (15) extending between the infeed portion (13a) and the outfeed portion (13b) of the conveyor (13), said base (15) being configured to receive the belt (1a) or discrete sheet (1b) advancing along the infeed direction;

respective opposing surfaces (16, 17) emerging from the base (15) and converging with each other along said winding direction (WD), said surfaces (16, 17) being configured to be active on the first and second end portions (2, 3) of the strip (1a) or discrete sheet (1b) being wound, respectively;

a through opening (14) located at the outlet portion (13b) of the conveyor (13), known as a through opening (14) defining a passage section for the passage of the strip (1a) or the discrete sheet (1b) wound or being wound;

in which said conveyor (13) is configured for:

receive the strip (1a) or discrete sheet (1b) in substantially flat form at the entry portion (13a), and deforming the first end portion (2) and the second end portion (3) away from the plane of the strip (1a) or of the discrete sheet (1b) to define a winding during the advancement along the winding direction, zones of the first end portion (2) and of the second end portion (3) being more forward along the winding direction being more deformed than corresponding more rearward zones the first end portion (2) and the second end portion (3) facing each other and overlapping to define a mutually overlapping portion (4) at least downstream of the exit portion (13b) to define a cylindrical body (5), a winding body (11) extending along a main axis (A) substantially parallel or coincident with said winding axis and configured to receive in winding said cylindrical body (5), a constraining station (20) configured to constrain the first end portion (2) with the second end portion (3) at the mutual overlapping portion (4) to define a straw (50) extending between a first and second free edges (51, 52) that are substantially circular.

A fifth aspect is directed to a method for making straws (50) optionally by means of an apparatus (100) according to any of the preceding and following aspects, said method comprising the steps of:

providing a strip (1a) or discrete sheet (1b) of paper sheet material at a feeding station in particular toward the conveyor (13);

determining the transit of the paper sheet material through the conveyor (13), said transit phase determining the winding of the paper sheet material around said winding axis to define a cylindrical body (5) made of paper sheet material, in which the first end portion (2) and the second end portion (3) are facing each other and overlapping to define a mutual overlapping portion (4) at least at the exit portion (13b) of the conveyor;

activating the constraining station (20) to constrain the first end portion (2) with the second end portion (3) at the mutual overlapping portion (4).

In a 6th aspect according to any one of the preceding aspects, said conveyor (13) comprises one or more side walls (15, 16, 17) defining an internal traversing volume laterally limited by said one or more side walls of said conveyor and configured to receive in traversal the sheet material, said conveyor (13) further comprising an access opening to said internal traversing volume and an exit opening from said internal traversing volume, in which said access opening has a first radial dimension of access, and in which said exit port has a second radial dimension of exit, said first radial dimension of access being greater than said second radial dimension of exit.

In a 7th aspect according to any one of the preceding aspects, said outlet defines a through opening (14) located at the outlet portion (13b) of the conveyor (13), said through opening (14) defining a substantially closed passage section.

In an 8th aspect according to any one of the preceding aspects, said conveyor (13) comprises an internal passage volume converging along the winding direction and has a passage opening (14), at the outlet portion (13b), having a radial dimension substantially equal to a desired size of the straw, said radial dimension being between 5 mm and 15 mm, more particularly between 6 mm and 12 mm, more particularly between 7 mm and 10 mm.

In a 9th aspect according to any of the preceding aspects, the passage opening (14), at the outlet portion (13b), has a radial dimension substantially equal to a desired size of the straw, said radial dimension being between 5 mm and 15 mm, more particularly between 6 mm and 12 mm, more particularly between 7 mm and 10 mm.

In a 10th aspect according to any of the preceding aspects, said conveyor has a length, measured between the inlet portion (13a) and the outlet portion (13b) of between 2 cm and 20 cm, in particular between 5 cm and 15 cm.

In an 11th aspect according to any of the previous aspects, the base (15) is interposed between said first and second side wall (17).

In a 12th aspect according to any one of the preceding aspects, the first and second side walls (17) of the conveyor (13) have a respective first and second inclination with respect to said base (15), wherein said first inclination and second inclination are reduced to the advance along the winding direction (WD).

In a 13th aspect according to the previous aspect, the first and second side walls (17) of the conveyor (13) has:
  a respective first and second maximum inclination at the inlet portion (13a) of the conveyor (13), said maximum inclination being optionally equal to 90°+10°, and
  a respective first and second minimum inclination at the outlet portion (13b) of the conveyor (13), said minimum inclination being optionally 0°,
    wherein the first and second maximum inclinations are greater in value than said first and second minimum inclinations.

In a 14th aspect according to any of the preceding aspects from 12, said first and second inclinations of the first and second side walls (16, 17) of the conveyor (13), respectively, vary in a constant manner with respect to an increment along the winding direction (WD), in particular where a first derivative of the first and second inclinations, with respect to an increment along the winding direction (WD), defines a continuous function.

In a 15th aspect according to any of the preceding aspects, where the conveyor has side walls converging on each other along the winding direction, in particular where said side walls are configured to completely surround the sheet material when, during an operating condition of the apparatus, it is passing through the conveyor (13).

In a 16th aspect according to any of the above, said first and second inclination with respect to the base (15) of the conveyor (13) is reduced:
  along the winding direction (WD),
    in particular where a first derivative of the first and second inclination, with respect to an increment along said winding direction (WD), is a continuous function, and
  along one direction in the height of the first and second side walls (17),
    in particular where a first derivative of the first and second inclination, with respect to an increment along said direction in height away from said base (15), is a continuous function.

In a 17th aspect according to any of the preceding aspects, said first and said second side walls (16, 17) of the conveyor (13) are, at least at the outlet portion (13b) of the conveyor (13), substantially parallel to, and spaced from, the base (15) of the conveyor (13) to define the top wall (18) and the outlet section.

In a 18th aspect according to any one of the preceding aspects, the first and second side walls (16, 17) of the conveyor (13) exhibit, at least at the outlet portion (13b) of the conveyor (13), an arcuate form with respective concavities directed towards the base (15) of the conveyor (13).

In 19th aspect according to the preceding aspect, said arcuate shape of the first and second side walls (16, 17) defines a respective first and second radius of curvature which reduce along the winding direction (WD) from the inlet portion (13a), or an intermediate portion, of the conveyor (13) to the outlet portion (13b) of the conveyor (13).

In 20th aspect according to any of the previous aspects, said first and second radius of curvature of the first and second side walls respectively (17) decreases steadily along said winding direction (WD).

In 21th aspect according to any of the preceding aspects, said first and second radii of curvature of the first and second side walls (17) respectively, are reduced with respect to an increment along the height direction of the first and second side walls (17) in moving away from the base (15) in particular in a constant manner, wherein a first derivative of the first and second radii of curvature, with respect to an increment along the respective height direction of the first and second side walls (17), is a continuous function.

In a 22th aspect according to any one of the preceding aspects, the first and second side walls (17) of the conveyor (13) exhibit, starting from the inlet portion (13a), or an intermediate portion, of the conveyor (13) to the outlet portion (13b) of the conveyor (13), a converging funnel-like pattern in the direction of the through opening (14).

In a 23th aspect according to any of the preceding aspects, the first and second sidewalls (17) exhibit a spiral progression along the winding axis to the exit section of the conveyor (13), in particular where the spiral shape of the first sidewall (16) has the opposite direction to the spiral shape of the second sidewall (17).

In a 24th aspect according to any of the preceding aspects, at least at the outlet portion (13b) of the conveyor (13), the first and second side walls (17) are asymmetrical to each other with respect to a plane passing through the winding axis and orthogonal to said base (15).

In 25th aspect according to any of the above, at least at the outlet portion (13b) of the conveyor (13), the first side wall (16) has a different radius of curvature than the radius of curvature of the second side wall (17).

In a 26th aspect according to any of the preceding aspects, the conveyor passage section (13) has at least one axis of asymmetry, such that a portion of that passage section has a different concavity from another portion of that passage section, defining a discontinuity, said discontinuity comprising a step or the presence of a gap.

In a 27th aspect according to any of the preceding aspects, the through section of the outlet portion (13b) of the conveyor (13) is substantially circular in shape, closed or at least partially spiralling to define a step or gap, said gap being configured to allow the passage of the first or second advancing end portion along the winding direction.

In a 28th aspect according to any of the above aspects, the side walls and base (15) of the conveyor (13) define, along the winding direction (WD), a spiral, optionally a logarithmic spiral.

In a 29th aspect according to any of the above aspects:
  at the inlet portion (13a) of the conveyor (13), the first and second side walls (16, 17) are spaced apart; and
  at the outlet portion (13b) of the conveyor (13), the first and second side walls (16, 17) are coincident with each other and define the top wall (18) of the through opening (14) of the conveyor (13).

In a 30th aspect according to any of the above, the through opening (14) is located between said first and second side walls (16, 17) of the conveyor (13) at the outlet portion (13b).

In a 31st aspect according to any of the above, the feeding station is located upstream of the conveyor (13).

In a 32nd aspect according to any of the above, the through-hole (14) defines a through-hole that connects the inlet portion (13a) with the outlet portion (13b) of the conveyor.

In a 33rd aspect according to any of the preceding aspects, the conveyor (13) is configured to provide the cylindrical body (5) exiting the passage section with the first end portion (2) and the second end portion (3) facing each other to define the mutual overlapping portion (4).

In 34th aspect according to any of the above, the conveyor is a passive component.

In 35th aspect according to any of the previous aspects, a combination of the forward movement of the paper material along the winding direction and the passage of the paper material through the conveyor (13) causes the paper material to wind around the winding axis.

In 36th aspect according to any one of the preceding aspects, the conveyor (13), and in particular the portion of the conveyor (13) in charge of determining the winding of the paper material around the winding axis, is static, in particular having no moving components, particularly with respect to the support structure (60), to determine the winding of the paper material.

In 37th aspect according to any of the preceding aspects, the winding body (11) extends between a first end portion (11a) and a second end portion (11b) along said main axis (A), and in which:
the first end portion (11a) is placed upstream of said conveyor passage section (13) according to the winding direction (WD), in particular the first end portion (11a) being placed between the first and second side wall (17) of the conveyor (13), and
the second end portion (11b) is arranged downstream of the conveyor (13) according to the winding direction (WD) and spaced from the passage opening.

In 38th aspect according to any one of the preceding aspects:
the first end portion (11a) is placed at a distance P1 from the conveyor outlet section (13), and
the second end portion (11b) is placed at a distance P2 from the conveyor outlet section (13),
where P2>P1, in particular P2 being at least twice or three times as large as P1, in particular where P2 is between 10 cm and 25 cm.

In a 39th aspect according to any one of the preceding aspects, the winding body, at least during an operating condition of the straw making (50), is fixed, in particular fixed in rotation and translation with respect to the support structure (60) and/or with respect to the conveyor (13).

In a 40th aspect according to any one of the preceding aspects, the winding body (11) has a section, according to a plane orthogonal to the main axis (A), comprising a first profile (11a) preferably semi-circular, defining a first radius or a first distance D1 with respect to the main axis (A), and a second profile (11b), in particular rectilinear, concave or convex, defining a second distance D2 with respect to the main axis (A), the first distance D1 being greater than the second distance D2.

In a 41st aspect according to any of the preceding aspects, the straw (50) has a cylindrical shape defining an inner circumference IC, the sum of an extension in length of said first and second contours (11a, 11b) defining a perimeter value P less than said inner circumference IC of the straw (50), in particular where 0.5*IC<P<0.98*IC, more particularly where 0.7*IC<P<0.95*IC.

In a 42nd aspect according to any one of the preceding aspects, the winding body (11) comprises a side surface, said side surface comprising a first curved side surface extending along the main axis (A), and a second substantially flat side surface extending along the main axis (A), in particular said cylindrical body comprising a flattening on said side surface, said flattening extending lengthwise along the main axis (A).

In a 43rd aspect according to any one of the preceding aspects, the feeding station (30) comprises at least one advancement roller configured, during a condition of use of the apparatus, to contact the strip (1a) or the discrete sheet (1b) and to determine its feed along the feed direction and/or along the winding direction (WD).

In a 44th aspect according to any one of the preceding aspects, the feeding station comprises an upstream advancement system (80) configured, during a condition of use of the apparatus, to contact the strip (1a) or the discrete sheet (1b) and to determine its feed along the feed direction and/or along the winding direction (WD), said upstream advancement system (80) being arranged upstream of the conveyor (13).

In a 45th aspect according to the previous aspect, the upstream advancement system (80) comprises a first and a second advancement roller (82), each of said first and second advancement rollers (81, 82) respectively comprising an outer surface configured to contact the strip (1a) or the discrete sheet (1b), wherein the outer surface of the first advancement roller (81) faces the outer surface of the second advancement roller (82), and wherein said first and second advancement rollers (81, 82) are counter-rotating with each other.

In a 46th aspect according to any of the preceding aspects, the outer surface of the first advancement roller (81) is configured to contact an upper surface of the discrete strip or sheet, while the outer surface of the second advancement roller (82) is configured to contact a lower surface, and opposite said upper surface, of the discrete strip or sheet.

In a 47th aspect according to any one of the preceding aspects, the first advancement roller (81) is movable by rotation about a first axis of rotation (R1), and the second advancement roller (82) is movable by rotation about a second axis of rotation (R2), wherein said first and second axes of rotation are parallel to each other and spaced apart.

In a 48th aspect according to any one of the preceding aspects, the feeding station (30) comprises at least one electric motor operatively connected to the first and/or second advancement rollers (82), said electric motor being configured to rotate said first and/or second advancement rollers (82) to bring about an advancement of the strip (1a) or the discrete sheet (1b) towards the conveyor (13).

In a 49th aspect according to any one of the preceding aspects, the apparatus comprises a downstream advancement system (90) arranged downstream of the conveyor (13) with respect to the winding direction (WD), said downstream advancement system (90) comprising at least one drive roller configured to contact the cylindrical body (5) or the straw (50) and to pull it along a direction defined by the main axis (A) of the winding body away from the conveyor (13).

In 50th aspect according to the preceding aspect, said drive roller comprises an outer surface configured to contact the strip (1a) or the discrete sheet (1b), said outer surface being facing said winding body (11), in particular wherein, during an operating condition of the apparatus, the strip (1a) or the discrete sheet (1b) is interposed between said drive roller and said winding body (11).

In 51st aspect according to any of the preceding aspects, said downstream advancement system (90) is configured to result in an ejection phase of the straw from the support structure (60).

In a 52nd aspect according to any one of the preceding aspects, the downstream advancement system (90) comprises at least one electric motor operatively connected to said at least one drive roller and configured to rotate said drive roller to determine an advancement of the cylindrical body (5) or the straw (50) along the main axis (A), optionally to determine its ejection and/or to determine the crossing of the belt (1a) or the discrete sheet (1b) through the conveyor (13).

In a 53rd aspect according to any one of the preceding aspects, the apparatus comprises a system for ejecting the straw (50) from the support structure (60), in particular said ejection system comprising at least one ejection roller configured to contact the straw (50) to pull it along a direction defined by the main axis (A) of the winding body away from the conveyor (13) and the winding body (11), said ejector roller comprising a respective outer surface configured to contact said straw (50), said outer surface being facing said winding body (11), in particular wherein, during a straw ejection condition, said straw (50) is interposed between said ejector roller and said winding body (11).

In 54th aspect according to any of the preceding aspects, the ejection system is arranged downstream of the downstream advancement system (90), such that the downstream advancement system (90) is interposed between the conveyor (13) and the ejection system, and in which
the draw roller of the downstream advancement system (90) faces the winding body,
optionally the ejection roller of the ejection system faces the winding body
and in which the cutting station is interposed between said downstream advancement system (90) and said ejection system.

In 55th aspect according to any of the preceding aspects, the feeding station comprises an alignment structure (33) located upstream of the conveyor (13) and configured to support and maintain in flat form the belt (1a) or discrete sheet (1b) being fed to the conveyor (13).

In 56th aspect according to the previous aspect, said alignment structure (33) comprises:
a lower support defining a support surface configured to receive the strip (1a) or the discrete sheet (1b),
and an upper support defining an auxiliary surface facing, at least partially, said lower support surface,
particularly where the auxiliary surface of the upper support is substantially parallel to the support surface of the lower support.

In 57th aspect according to any one of the preceding aspects,
the upper support comprises a respective side wall, optionally substantially orthogonal to the auxiliary surface, extending in length along a direction substantially parallel to the feed direction and/or the winding direction (WD),
the lower support comprises a respective side wall, optionally substantially orthogonal to the support surface, extending in length along a direction substantially parallel to the feed direction and/or the winding direction (WD),
where the side wall of the upper support and the side wall of the lower support are parallel to each other and parallel to the feed axis and/or winding axis.

In a 58th aspect according to any of the preceding aspects, the support surface of the lower support is partially facing said auxiliary surface of the upper support.

In a 59th aspect according to any of the above, the support surface and the auxiliary surface extend in length parallel to the winding direction (WD), and in width along a transverse axis orthogonal to said extension in length,
in which the bearing surface and the auxiliary surface are offset from each other along said transverse axis, in particular by a dimension S between 2 mm and 5 mm, to define:
a first gap between the support surface of the lower support and the side wall of the upper support, and
a second gap between the auxiliary surface of the upper support and the side wall of the lower support,
particularly where the width of the support surface and the width of the auxiliary surface are smaller than the distance between the respective side walls of the upper and lower support,
and where said first and second gaps are between 3 mm and 5 mm.

In a 60th aspect according to any of the preceding aspects, the lower support comprises a first side wall emerging in height substantially orthogonally from the support surface along a first direction, and the upper support comprises a second side wall emerging in height substantially orthogonally from the auxiliary surface along a second direction.

In a 61st aspect according to the preceding aspect, said first and second directions are opposite to each other, and wherein a distance interposed between said first and second side walls of the alignment structure (33) defines a passage width for allowing the strip (1a) or the discrete sheet (1b) to pass along the feeding or winding direction, in particular said passage width being equal to the width of said strip (1a) or discrete sheet (1b), or in particular said passage width being greater by 1 mm or 2 mm than the width of said strip (1a) or discrete sheet (1b).

In a 62nd aspect according to any of the above, the first and second side walls (17) are convergent and incident at least at the exit portion (13b).

In a 63rd aspect according to any of the above, said portion of mutual overlap (4) extends between the first and second free edges (51, 52) of the straw (50) along a substantially straight direction.

In a 64th aspect according to any one of the preceding aspects, the feeding station (30) is configured to allow the strip to be unwound along an unwinding direction (UD), said feeding station (30) comprising a support (32) configured to carry a reel (31) of strip (1a) and to allow it to be rotated about a rotation axis (B), said reel (31) being configured to unwind consecutive portions of strip (1a),
the feeding station (30) comprising at least one motor connected to the support (32) and configured to rotate said reel (31) either directly or indirectly, e.g. by dragging the strip, to unwind consecutive portions of the strip (1a).

In a 65th aspect according to any of the preceding aspects, the constraining station (20) comprises a heat-sealing element (21) configured to contact at least a portion of the portion of the mutual overlap (4) interposed between said heat-sealing element (21) and the winding body (11).

In a 66th aspect according to the previous aspect, the heat-sealing element (21) is:
- moving along a direction parallel to the winding body (11), optionally the constraining station (20) comprising an actuator (29) connected to the heat-sealing element (21) and configured to control its movement at least during a phase of constraining the first end portion with the second end portion; and/or
- moving along a direction perpendicular to the winding body (11), optionally the tie station (20) comprising an actuator (29) connected to the heat-sealing element (21) and configured to control its movement between:
- a distal position in which the winding body (11) and the heat-sealing element (21) are spaced apart; and
- a close position in which the winding body (11) and the thermo-sealing element (21) are brought together, the thermo-sealing element (21), at least during an operating condition of the apparatus exerting a thrust on the mutual coupling portion (4) when the latter is interposed between the heat-sealing element (21) and the winding body (11), optionally said heat-sealing element (21) being a heat-sealing bar extending at least partially along the main axis (A) of the winding body (11) and facing the latter.

In a 67th aspect according to any of the preceding aspects, the constraining station (20) comprises an adhesion roller facing the winding body (11) and movable by rotation about its own axis, said axis being in particular fixed and orthogonal to the main axis (A) of the winding body (11),
said adhesion roller being configured for:
- contact and push on the mutual overlapping portion (4) of the cylindrical body (5) made of paper material during an operating condition of the apparatus;
- allow or determine the advancement of the paper material along the winding direction;
- optionally heat the adhesive material on the mutual overlapping portion, in particular said adhesion roller defining a heat-sealing element.

In 68th aspect according to any one of the preceding aspects, wherein said adhesion roller comprises a heating element configured to heat, in particular to a heat-sealing temperature, at least one circumferential surface of the adhesion roller capable of contacting the sheet material.

In a 69th aspect according to any of the previous aspects, the constraining station (20) is placed downstream of the conveyor (13), particularly where the constraining station is interposed between the conveyor (13) and the downstream advance system (90).

In a 70th aspect according to any one of the preceding aspects, the apparatus comprises at least one cutting station (40) comprising at least one cutting tool of a choice between a rotating or translating blade (41), said cutting station (40) being configured to define a cut on at least a portion of the strip (1a), said cut being transverse, optionally perpendicular, with respect to the feeding direction or the winding direction (WD) of the strip (1a).

In 71st aspect according to any of the above, the cutting station (20) is:
- interposed between the conveyor (13) and the downstream advancement system (90), or
- interposed between the downstream advancement system (90) and the ejection system, or
- interposed between the feeding station (30) and the conveyor (13)

In 72nd aspect according to any one of the preceding aspects, the cutting station (40) comprises at least one actuator configured to move the cutting tool along a direction perpendicular to the feed direction or the winding direction (WD) or the main axis (A) of the winding body (11).

In 73rd aspect according to any of the above, the cutting station is:
- interposed between the feeding station and the conveyor (13); or
- placed downstream of the downstream advance system (90).

In 74th aspect according to any one of the preceding aspects, the apparatus comprises a control unit (70) operatively connected to the constraining station (20) and to at least one of the upstream advancement system (80) and the downstream advancement system (90), optionally being operatively connected to the feeding station (30) and/or the cutting station (40).

In 75th aspect according to the previous aspect, said control unit (70) is configured for, or the method comprises of:
- optionally control the feeding station (30) to set consecutive portions of strip (1a) or discrete sheets (1b) in feed to the conveyor (13) or in feed to the upstream advancement system (80);
- activating at least one of the upstream advancement system (80) and the downstream advancement system (90) to determine the movement of the strip or the discrete sheet in advance along the winding direction (WD), wherein said phase of the paper material advancing in the conveyor (13) determines the winding of the strip or the discrete sheet around the winding axis;
- activating the constraining station (20) to constrain the first end portion (2) with the second end portion (3) at the mutual overlapping portion (4),
- optionally activate the cutting station (40) to define the cutting of said strip (1a);
- optionally in which the phase of activating the cutting station (40) is preceding, simultaneous with or following the phase of activating the constraining station (20).

In a 76th aspect according to any one of the preceding aspects, the apparatus comprises a control unit (70) configured to, or the method comprises of, performing a straw manufacturing procedure (50) comprising the following steps, optionally performed in the following order:
- commanding the feeding station (30) to move the belt (1a) in feed towards and through the conveyor (13) and/or activating the upstream advancement system (80) to move the belt (1a) in feed towards and through the conveyor (13), in particular the phase of commanding the feeding station (30) including the phase of driving the motor of the feeding station (30),
  - and in which the movement of the belt to and through the conveyor (13) causes the paper material to be wound around the winding axis;
- optionally activate the cutting station (40) to define the ribbon cut (1a), whereby the cutting station (40) is interposed between the feeding station (30) and the forming station (10), in particular between the feeding station (30) and the alignment structure (33),
  - the cutting phase by defining a straw length (50);
- activate the constraining station (20) to determine the adhesion between the first and second end portions (2, 3) of the paper material;
- activate the downstream advance system (90) to advance the straw (50) exiting the support structure (60) through the window (61).

In 77th aspect according to any one of the preceding aspects, the apparatus comprises a control unit (70) configured to, or the method comprises of, performing a straw manufacturing procedure (50) comprising the following steps optionally performed in the following order:

activating the downstream advancement system (90) to pull the belt (1*a*) to and through the conveyor (13), in particular the step of activating the downstream advancement system (90) including the step of driving the motor connected to the drive roller of the downstream advancement system (90), in which the movement of the belt to and through conveyor 13 causes the paper material to be wound around the winding axis;

activate the constraining station (20) to determine the adhesion between the first and second end portions (2, 3) of the paper material;

optionally activate the cutting station (40) to define the cut of belt 1*a*, in which the cutting station (40) is arranged downstream of the downstream advancement system (90), in particular where the cutting station (40) is interposed between the downstream advancement system (90) and the ejection system, the cutting phase by defining the length of the straw 50.

In 78th aspect according to any one of the preceding aspects, the apparatus comprises the ejection system, and wherein the procedure for making the straw further comprises a step of activating the ejection system to advance the straw (50) out of the support structure (60) through the window (61).

In a 79th aspect according to any of the preceding aspects, the manufacturing procedure comprises a step, following a reel replacement step (31) or following an initial strip set-up step within the apparatus, of:

manually guide the belt (1*a*) through the conveyor (13) along the winding direction, and engage the belt (1*a*) to the downstream advancement system (90) in such a way that a rotation of the drive roller results in a simultaneous feed of the belt (1*a*).

In a 80th aspect according to any one of the preceding aspects, the support structure (60) defines an enclosure containing at least the feeding station (30), the forming station (10) and the constraining station (20); the support structure (60) comprising at least one side wall, a base wall and a top wall connected to the side wall to restrict a user subject access to the substantially enclosed internal volume, wherein one wall is at least partially transparent to allow, from outside the support structure (60), a view of the internal volume.

In a 81st aspect according to any of the preceding aspects, the support structure (60) comprises a window (61) configured to allow the straw (50) to be ejected from the internal volume of the support structure (60).

In a 82nd aspect according to any of the preceding aspects, the strip or discrete sheet has a width measured orthogonally with respect to the winding direction (WD) or feed direction, in particular measured between an extreme edge of the first end portion and an extreme edge of the second end portion, said width being substantially equal to the passage width of the alignment structure (33), in particular said width of the strip or discrete sheet being between 18 mm and 40 mm, in particular between 20 mm and 35 mm.

In an aspect according to any of the above, where the foil material of the strip or discrete sheet is suitable for food contact.

In a 83rd aspect according to any one of the preceding aspects, the strip (1*a*) or the discrete sheet (1*b*) comprises adhesive material, in particular food-grade adhesive, at the first and/or second end portions (2, 3) to allow, during the bonding steps, the bonding between said first and second end portions (2,3) to define the straw (50), in particular wherein the adhesive material is present at the first and second end portions.

In a 84th aspect according to any of the preceding aspects, in which said bonding material comprises a heat-sealable material or a cold-bonding material.

In a 85th aspect according to any of the preceding aspects, said strip (1*a*) or discrete sheet (1*b*) extends in thickness between an upper surface (6) and a lower surface (7), and in which the strip or discrete sheet comprises:

a first layer of adhesive material (8*a*), in particular food glue, on the upper surface (6) and at the first end portion (2), and a second layer of adhesive material (8*b*), in particular food glue, placed on the bottom surface (7) and at the second end portion (3).

In a 86th aspect according to any of the preceding aspects, the method comprises a step of heating said adhesive material when interposed between the thermo-welding element (21) and the winding body to determine the bond between the first end portion and the second end portion.

In a 87th aspect according to any of the preceding aspects, the method comprises the step of feeding the strip (1*a*) or the discrete sheet (1*b*) through the feeding station (30) to the alignment structure (33).

In 88th aspect according to any one of the preceding aspects, the strip (1*a*) or the discrete sheet (1*b*) are made of material suitable for contact and in particular impermeable to liquids.

In a 89th aspect according to any one of the preceding aspects, the strip (1*a*) or the discrete sheet (1*b*) is made of polyethylene or bipolyester paper material, said strip (1*a*) or discrete sheet (1*b*) being heat-sealable in particular by means of the heat-sealing element 21 of the apparatus (100).

In a 90th aspect according to any of the previous aspects, the second end portion (3) is placed inside the straw (50).

In a 91st aspect according to any of the previous aspects, in which the first and second layers of adhesive material (8*a*, 8*b*) face each other and are in contact with each other at the outlet portion (13*b*) of the conveyor (13).

A 92nd aspect is directed to an apparatus (100; 200) for making straws comprising a support structure (60; 600) defining an internal volume and bearing:

a feeding station (30; 300) configured for feeding a strip (1*a*) or at least one discrete sheet (1*b*) made of paper material along a feeding direction, said strip or discrete sheet extended:

lengthwise along a first direction substantially parallel to or coinciding with said feeding direction, and widthwise along a second direction orthogonal to said first direction between a first end portion (2) and a second end portion (3), a forming station (10; 101) comprising:

a conveyor (13; 130) extended lengthwise, along a winding axis, between an inlet portion (13*a*; 130*a*), configured for receiving the strip (1*a*) or the discrete sheet (1*b*), and an outlet portion (13*b*; 130*b*) configured for allowing the movement of the strip (1*a*) or discrete sheet (1*b*) exiting from said conveyor (13; 130), said winding axis defining a winding direction (WD) which extends from the inlet portion (13*a*; 130*a*) to the outlet portion (13*b*; 130*b*) of the conveyor (13; 130), said conveyor (13; 130) further comprising:

a base (15; 150) extended between the inlet portion (13*a*; 130*a*) and the outlet portion (13*b*; 130*b*) of the conveyor (13; 130), said base (15; 150) being configured for receiving in abutment the strip (1a) or the discrete sheet (1b);
  a first lateral wall (16; 160) and a second lateral wall (17; 170), opposite each other and extended heightwise starting from said base (15; 150), said first and second lateral wall (16, 17; 160, 170) converging with respect to each other along said winding direction (WD);
  a through opening (14; 140) situated at least at the outlet portion (13b; 130b) of the conveyor (13; 130), said through opening (14; 140) defining a passage section, optionally circular, laterally interposed between the first and the second lateral wall (16, 17; 160, 170), and vertically interposed between said base (15; 150) and a top wall (18; 180) opposite said base (15; 150);
  wherein said conveyor (13; 130) is configured for:
    receiving the strip (1a) or the discrete sheet (1b) optionally in substantially flat form at least at the inlet portion (13a; 130a), and
    winding said strip (1a) or discrete sheet (1b) around said winding axis to define a cylindrical body (5) made of paper material, wherein the first end portion (2) and the second end portion (3) face each other and are superimposed to define a mutual overlap portion (4) at least at the outlet portion (13b; 130b),
a winding body (11; 110) extended along a main axis (A) substantially parallel to or coinciding with said winding axis and configured for receiving in abutment said cylindrical body (5), said winding body (11; 110) traversing said through opening (14; 140) of the conveyor (13; 130);
a constraining station (20; 201) configured for constraining, during a constraining step, the first end portion (2) with the second end portion (3) at least at the mutual overlapping portion (4) to define a straw (50) extended between a first and a second substantially circular free edges (51, 52), the constraining station (20; 201) being arranged downstream of the forming station (10; 101) and comprising at least a rotatable component configured to allow advancement of the cylindrical body (5) during said constraining step;
a cutting station (40; 400) comprising at least one cutting tool (41; 410).

A 93rd aspect is directed to an apparatus (100; 200) for making straws comprising a support structure (60; 600) defining an internal volume and bearing:
  a feeding station (30; 300) configured for feeding a strip (1a) or at least one discrete sheet (1b) made of paper material along a feeding direction, said strip or discrete sheet extended:
    lengthwise along a first direction substantially parallel to or coinciding with said feeding direction, and
    widthwise along a second direction orthogonal to said first direction between a first end portion (2) and a second end portion (3),
  a forming station (10; 101) comprising:
    a conveyor (13; 130) extended lengthwise, along a winding axis, between an inlet portion (13a; 130a), configured for receiving the strip (1a) or the discrete sheet (1b), and an outlet portion (13b; 130b), configured for allowing the movement of the strip (1a) or discrete sheet (1b) exiting from said conveyor (13; 130), said winding axis defining a winding direction (WD) which extends from the inlet portion (13a; 130a) to the outlet portion (13b; 130b) of the conveyor (13; 130),
    said conveyor (13; 130) further comprising:
      a base (15; 150) extended between the inlet portion (13a; 130a) and the outlet portion (13b; 130b) of the conveyor (13; 130), said base (15; 150) being configured for receiving in abutment the strip (1a) or the discrete sheet (1b);
      a first lateral wall (16; 160) and a second lateral wall (17; 170), opposite each other and extended heightwise starting from said base (15; 150), said first and second lateral wall (16, 17; 160, 170) converging with respect to each other along said winding direction (WD);
      a through opening (14; 140) situated at least at the outlet portion (13b; 130b) of the conveyor (13; 130), said through opening (14; 140) defining a passage section, optionally circular, laterally interposed between the first and the second lateral wall (16, 17; 160, 170), and vertically interposed between said base (15; 150) and a top wall (18; 180) opposite said base (15; 150);
      wherein said conveyor (13; 130) is configured for:
        receiving the strip (1a) or the discrete sheet (1b) optionally in substantially flat form at least at the inlet portion (13a; 130a), and
        winding said strip (1a) or discrete sheet (1b) around said winding axis to define a cylindrical body (5) made of paper material, wherein the first end portion (2) and the second end portion (3) face each other and are superimposed to define a mutual overlap portion (4) at least at the outlet portion (13b; 130b),
    a winding body (11; 110) extended along a main axis (A) substantially parallel to or coinciding with said winding axis and configured for receiving in abutment said cylindrical body (5), said winding body (11; 110) traversing said through opening (14; 140) of the conveyor (13; 130);
    a constraining station (20; 201) configured for constraining, during a constraining step, the first end portion (2) with the second end portion (3) at least at the mutual overlapping portion (4) to define a straw (50) extended between a first and a second substantially circular free edges (51, 52),
    the constraining station (20; 201) being arranged downstream of the forming station (10; 101) and comprising at least a rotatable component configured to allow advancement of the cylindrical body (5) during said constraining step.

In a 94th aspect according to the preceding aspect, the apparatus further comprises a cutting station (40; 400) comprising at least one cutting tool (41; 410).

A 95th aspect is directed to an apparatus (100; 200) for making straws comprising a support structure (60; 600) defining an internal volume and bearing:
  a feeding station (30; 300) configured for feeding a strip (1a) or at least one discrete sheet (1b) made of paper material along a feeding direction, said strip or discrete sheet extended:
    lengthwise along a first direction substantially parallel to or coinciding with said feeding direction, and
    widthwise along a second direction orthogonal to said first direction between a first end portion (2) and a second end portion (3), a forming station (10; 101) comprising:
- a conveyor (13; 130) extended lengthwise, along a winding axis, between an inlet portion (13a; 130a), configured for receiving the strip (1a) or the discrete sheet (1b), and an outlet portion (13b; 130b) configured for allowing the movement of the strip (1a) or discrete sheet (1b) exiting from said conveyor (13; 130), said winding axis defining a winding direction (WD) which extends from the inlet portion (13a; 130a) to the outlet portion (13b; 130b) of the conveyor (13; 130),
- said conveyor (13; 130) further comprising:
  - a base (15; 150) extended between the inlet portion (13a; 130a) and the outlet portion (13b; 130b) of the conveyor (13; 130), said base (15; 150) being configured for receiving in abutment the strip (1a) or the discrete sheet (1b);
  - a first lateral wall (16; 160) and a second lateral wall (17; 170), opposite each other and extended heightwise starting from said base (15; 150), said first and second lateral wall (16, 17; 160, 170) converging with respect to each other along said winding direction (WD);
  - a through opening (14; 140) situated at least at the outlet portion (13b; 130b) of the conveyor (13; 130), said through opening (14; 140) defining a passage section, optionally circular, laterally interposed between the first and the second lateral wall (16, 17; 160, 170), and vertically interposed between said base (15; 150) and a top wall (18; 180) opposite said base (15; 150);
- wherein said conveyor (13; 130) is configured for:
  - receiving the strip (1a) or the discrete sheet (1b) optionally in substantially flat form at least at the inlet portion (13a; 130a), and
  - winding said strip (1a) or discrete sheet (1b) around said winding axis to define a cylindrical body (5) made of paper material, wherein the first end portion (2) and the second end portion (3) face each other and are superimposed to define a mutual overlap portion (4) at least at the outlet portion (13b; 130b),
- a winding body (11; 110) extended along a main axis (A) substantially parallel to or coinciding with said winding axis and configured for receiving in abutment said cylindrical body (5), said winding body (11; 110) traversing said through opening (14; 140) of the conveyor (13; 130).

In a 96th aspect according to the preceding aspect, the apparatus comprises a constraining station (20; 201) configured for constraining, during a constraining step, the first end portion (2) with the second end portion (3) at least at the mutual overlapping portion (4) to define a straw (50) extended between a first and a second substantially circular free edges (51, 52).

In a 97th aspect according to the preceding aspect, the constraining station (20; 201) being arranged downstream of the forming station (10; 101) and comprising at least a rotatable component configured to allow advancement of the cylindrical body (5) during said constraining step.

In a 98th aspect according to any one of the preceding aspects from 95, the apparatus comprises a cutting station (40; 400) comprising at least one cutting tool (41; 410).

In a 99th aspect according to any one of the preceding aspects from 92, said rotatable component comprises either:
- at least one drive roller (910) rotatable about a rotation axis and comprising an external surface facing an external surface of the winding body (11; 110), the external surface of the at least one drive roller (910) being configured for directly abutting against the mutual overlap portion (4) of the cylindrical body (5) during a constraining step thereof, in particular the mutual overlap portion (4) of the cylindrical body (5) being interposed between the external surface of the drive roller (910) and the external surface of the winding body (11; 110) during the constraining step, in particular wherein the at least one drive roller (910) is a single drive roller;

or
- a first drive roller (910a) rotatable about a rotation axis, a second drive roller (910b) rotatable about a respective rotation axis, and a loop belt (920) wrapped around external surfaces of the first drive roller (910a) and of the second drive roller (910b), the loop belt (920) being rotatable around the first drive roller (910a) and the second drive roller (910b) defining an abutting plane facing an external surface of the winding body (11; 110) and configured to abut against the mutual overlap portion (4) during a constraining step of the cylindrical body (5), in particular wherein the loop belt (920) is interposed between the winding body (11; 110) and the first and second drive rollers (910a, 910b),
- in particular the mutual overlapping portion (4) of the cylindrical body (5) being interposed between said abutting plane and the external surface of the winding body (11; 110) during the constraining step.

In a 100th aspect according to the preceding aspect, said abutting plane of the loop belt is substantially flat.

In a 101st aspect according to any one of the preceding aspects from 99, the rotation axis of the at least one drive roller (910) of the constraining station (20; 201) is transversal, in particular orthogonal, to the main axis (A) of the winding body (11; 110).

In a 102nd aspect according to any one of the preceding aspects from 99, said rotational axis of the at least one drive roller (910) of the constraining station (20; 201) is fixed in position.

In a 103rd aspect according to any one of the preceding aspects from 99, the rotation axis of the first drive roller (910a) and the rotation axis of the second drive roller (910b) are transversal, in particular orthogonal, to the main axis (A) of the winding body (11).

In a 104th aspect according to any one of the preceding aspects from 99, said rotational axis of the first drive roller (910a) and said rotation axis of the second drive roller (910b) are fixed in position.

In a 105th aspect according to any one of the preceding aspects from 99, the constraining station (20; 201) comprises a heating system (930) configured to heat up either:
- the at least one drive roller (910) of the constraining station (20; 201) configured to abut against the mutual overlapping portion (4) of the cylindrical body (5) up to a constraining temperature for constraining the first end portion (2) with the second end portion (3) of the cylindrical body (5), or
- the loop belt (920), and optionally also at least one between the first and the second drive rollers (910a, 910b), up to a constraining temperature for constraining the first end portion (2) with the second end portion (3) of the cylindrical body (5).

In a 106th aspect according to the preceding aspect, the heating system (930) comprises an electric heating system, optionally including an electric resistance or an electric inductor.

In a 107th aspect according to any one of the preceding aspects from 99, the at least one drive roller (910) or the loop belt (920) of the constraining station (20; 201) comprises a metallic material, in particular wherein at least the external surface of the at least one drive roller (910) or of the loop belt (920) of the constraining station (20) is made of a metallic material such as one between steel, aluminum, copper and brass.

In a 108th aspect according to any one of the preceding aspects from 105, the constraining temperature is comprised between 50° C. and 200° C., more specifically between 50° C. and 150° C.

In a 109th aspect according to any one of the preceding aspects from 92, the apparatus comprises an advancement system configured to determine advancement of the strip (1*a*) or of the discrete sheet (1*b*) through the forming station (10) along an advancement direction (AD).

In a 110th aspect according to the preceding aspect, said advancement system comprises at least one advancement roller (81, 82, 91; 810, 820, 910, 910*a*, 910*b*, 950).

In a 111th aspect according to the preceding aspect, said advancement system comprises an electric motor (83; 830) operatively connected to said at least one advancement roller, the electric motor (83) being configured to rotate said at least one advancement roller to determine the advancement of the strip (1*a*) or of the discrete sheet (1*b*) along said advancement direction (AD).

In a 112th aspect according to the preceding aspect, the apparatus comprises a control unit (70) configured for performing a manufacturing procedure (1000) for making the straw (50), said manufacturing procedure (1000) comprising at least the following steps:
advancing the strip (1*a*) or the discrete sheet (1*b*) along the advancement direction (AD) by commanding the electric motor (83; 830) to drive the at least one advancement roller (81, 82, 91; 810, 820, 910, 910*a*, 910*b*, 950) of the advancement system, and simultaneously
constraining the first end portion (2) with the second end portion (3) of the cylindrical body (5) by activating the constraining station (20; 201), in particular wherein the step of activating the constraining station (20) comprises activating the heating system (930) of the constraining station (20; 201),
in particular wherein the advancing step is simultaneous to the constraining step.

In a 113th aspect according to any one of the preceding aspects from 111, the electric motor (830) is configured to rotate the at least one advancement roller continuously during the constraining step.

In a 114th aspect according to any one of the preceding aspects from 111,
said electric motor (83; 830) of the advancement system is operatively connected to the at least one drive roller (910) of the constraining station (201) and configured to drive said at least one drive roller (910) through a kinematic chain, said drive roller (910) being configured both to advance the cylindrical body (5) along the main axis of the winding body and to constrain the mutual overlapping portion (4);
or
said electric motor (830) of the advancement system is operatively connected to the loop belt (920) of the constraining station (201) and configured to drive said loop belt (920) through a kinematic chain, said loop belt (920) being configured both to advance the cylindrical body (5) along the main axis of the winding body and to constrain the mutual overlapping portion (4).

In a 115th aspect according to any one of the preceding aspects from 92, the at least one rotatable component of the constraining station (20; 201) defines a downstream advancement system (90; 900) configured to determine advancement of the strip or discrete sheet.

In a 116th aspect according to any one of the preceding aspects from 109, the advancement system comprises an upstream advancement system (80; 800) arranged upstream of the conveyor (13; 130) with respect to the advancement direction.

In a 117th aspect according to the preceding aspect, the upstream advancement system (80; 800) comprises one or more rollers configured to advance the strip (1*a*) or the discrete sheet (1*b*) along the advancement direction (AD).

In a 118th aspect according to any one of the preceding aspects from 116, the electric motor (83) of the advancement system (80) is operatively connected to both the upstream advancement system (80; 800) and to the at least one rotatable component of the constraining station (20; 201) through a kinematic chain, in particular operatively connected to the upstream advancement system (80; 800) and to either the at least one drive roller (910) or to at least one between the first and the second drive rollers (910*a*, 910*b*) of the constraining station (20; 201) through the kinematic chain.

In a 119th aspect according to any one of the preceding aspects from 116, the upstream advancement system (80; 800) is arranged upstream of the cutting station (40) with respect to the advancement direction (AD).

In a 120th aspect according to any one of the preceding aspects from 116, the upstream advancement system (80; 800) is interposed between the feeding station (30; 300) and the cutting station (40; 400).

In a 121st aspect according to any one of the preceding aspects from 109, the advancement system comprises an auxiliary advancement system (950) configured to determine, or to contribute to, the advancement of the strip (1*a*) or of the discrete sheet (1*b*) along the advancement direction (AD), the auxiliary advancement system (950) being arranged at the forming station (10; 101) or between the cutting station (40; 400) and the conveyor (13; 130).

In a 122nd aspect according to the preceding aspect, the auxiliary advancement system (950) comprises a respective first and second rollers (950*a*, 950*b*) facing each other and configured to allow the strip or the discrete sheet to pass in between.

In a 123rd aspect according to the preceding aspect, an external surface of the first roller (950*a*) of the auxiliary advancement system (950) faces an external surface of the second roller (950*b*) of the auxiliary advancement system (950).

In a 124th aspect according to any one of the preceding aspects from 122, the first and second rollers (950*a*, 950*b*) of the auxiliary advancement system (950) are counter-rotating with respect to each other.

In a 125th aspect according to any one of the preceding aspects from 122, the sheet material is configured for being interposed between said first and second rollers (950*a*, 950*b*) of the auxiliary advancement system (950) during an operating condition of the apparatus.

In a 126th aspect according to any one of the preceding aspects from 122, the first and second rollers (950*a*, 950*b*)

of the auxiliary advancement system (950) are opposite each other with respect to an advancement plane of the strip (1*a*) or of the discrete sheet (1*b*).

In a 127th aspect according to any one of the preceding aspects from 122, a rotating axis of at least one between the first and second rollers (950*a*, 950*b*) of the auxiliary advancement system (950) intersect the conveyor (130), in particular intersects at least one between the first and the second lateral walls of the conveyor (130).

In a 128th aspect according to any one of the preceding aspects from 122, at least one between the first and second rollers (950*a*, 950*b*) of the auxiliary advancement system (950) is interposed between the first and the second lateral walls of the conveyor (130).

In a 129th aspect according to any one of the preceding aspects from 121, the auxiliary advancement system (950), in particular at least one between the first and the second roller (950*a*, 950*b*) of the auxiliary advancement system (950), is interposed between the inlet portion (130*a*) and the outlet portion (130*b*) of the conveyor (130) along the winding direction.

In a 130th aspect according to any one of the preceding aspects from 121, the auxiliary advancement system (950) being interposed between the upstream advancement system (800) and the downstream advancement system (900).

In a 131st aspect according to any one of the preceding aspects from 121, the electric motor (830) is operatively connected through a kinematic chain to the upstream advancement system (800), the auxiliary advancement system (950) and to the at least one rotatable component of the constraining station (201), wherein the at least one rotatable component comprises in particular the drive roller (910) or the loop belt (920).

In a 132nd aspect according to any one of the preceding aspects from 111, the electric motor (830) is operatively connected through a kinematic chain to the upstream advancement system (800) and to the at least one rotatable component of the constraining station (201), wherein the at least one rotatable component comprises in particular the drive roller (910) or the loop belt (920).

In a 133rd aspect according to any one of the preceding aspects from 92, the cutting station (40; 400) is arranged upstream of the forming station (10; 101), optionally the cutting station (40; 400) being interposed between the upstream advancement system (80; 800) and the conveyor (13; 130) of the forming station (10; 101).

In a 134th aspect according to any one of the preceding aspects from 92, the at least one cutting tool (41; 410) of the cutting station (40; 400) comprises a rotating or a translating blade, said cutting station (40; 400) being configured for defining a cut on at least one portion of the strip (1*a*) or discrete sheet (1*b*), said cut being transverse, optionally perpendicular, with respect to the feeding direction or to the winding direction (WD).

In a 135th aspect according to any one of the preceding aspects from 92, the at least one cutting tool (41; 410) of the cutting station (40; 400) comprises a rotating blade (410) including a cutting edge (410*a*) extending widthwise at least between the first end portion (2) and the second end portion (3) of the strip (1*a*) or of the discrete sheet (1*b*).

In a 136th aspect according to the preceding aspect, said rotating blade (410) is rotatable about a cutting rotation axis (CR) transversal, optionally orthogonal, to the first direction of the strip or discrete sheet.

In a 137th aspect according to any one of the preceding aspects from 135, said cutting edge (410*a*) is transversal, optionally orthogonal, to the first direction of the strip or discrete sheet during a full rotation of the rotating blade (410) about the cutting rotation axis (CR).

In a 138th aspect according to any one of the preceding aspects from 135, said cutting edge (410*a*) is parallel to the cutting rotation axis (CR).

In a 139th aspect according to any one of the preceding aspects from 135, the cutting edge (410*a*) of the rotating blade (410) is distanced from the cutting rotation axis (CR) in particular by a distance D comprised between 20 mm and 100 mm.

In a 140th aspect according to any one of the preceding aspects from 135, the rotating blade (410) rotates, during an operating condition of the apparatus (200) and set an angular speed of the electric motor (830), at an angular speed which variates along a revolution of the rotating blade (41).

In a 141st aspect according to the preceding aspect, the angular speed of the blade (41) is maximum at an angular position where the blade (410) approaches an advancement plane of the strip (1*a*) or discrete sheet (1*b*).

In a 142nd aspect according to any one of the preceding aspects from 135, the apparatus comprises a kinematic system (430) connecting the electric motor (830) of the advancement system to the rotating blade (410), said kinematic system (430) defining a variable transmission ratio between the electric motor (830) of the advancement system and the rotating blade (410) of the cutting station (400).

In a 143rd aspect according to the preceding aspect, said transmission ratio is configured to vary as a function of the angular position of the rotating blade (410) and/or of the electric motor (830).

In a 144th aspect according to any one of the preceding aspects from 142, said transmission ratio is configured to vary between:
 a maximum value which corresponds, given a set rotation speed of the electric motor (830), to a substantially maximum speed of the rotating blade (410), in particular to a maximum rotational speed of the rotating blade (410), and
 a minimum value which corresponds, given a set rotation speed of the electric motor (830), to a substantially minimum speed of the rotating blade (410), in particular to a minimum rotational speed of the rotating blade (410).

In a 145th aspect according to the preceding aspect, the maximum value of the transmission ratio corresponds to a position of the rotating blade (410) approached to an advancement plane of the strip (1*a*) or discrete sheet (1*b*), in particular approached to the strip (1*a*) or discrete sheet (1*b*) during an operating condition of the apparatus.

In a 146th aspect according to any one of the preceding aspects from 142, said kinematic system (430) comprises either:
 a first gear (430*a*) and a second gear (430*b*) engaging the first gear (430*a*) which define said variable transmission ratio, and wherein the first gear (430*a*) and the second gear (430*b*) have both shapes that deviate from a circular shape; or
 a first pulley, a second pulley and a timing belt wrapped around the first pulley and the second pulley defining said variable transmission ratio, and wherein the first pulley and the second pulley have both shapes that deviate from a circular shape.

In a 147th aspect according to the preceding aspect:
 the first gear (430*a*) is equal in shape to the second gear (430*b*) and wherein the first gear is angularly shifted with respect to the second gear, or the first pulley is equal in shape to the second pulley and wherein the first pulley is angularly shifted with respect to the second pulley.

In a 148th aspect according to any one of the preceding aspects from 146:

the first gear and the second gear have a shape in the group between an oblong shape, oval shape, elliptical shape, triangular shape and quadrangular shape, or the first pulley and the second pulley have a shape in the group between an oblong shape, oval shape, elliptical shape, triangular shape and quadrangular shape.

In a 149th aspect according to any one of the preceding aspects from 92, the cutting station is rigidly synchronized with the advancement system through a kinematic chain, in particular wherein the cutting station, the advancement system and the constraining station (200) are rigidly synchronized with each other through a kinematic chain.

In a 150th aspect according to the preceding aspect, said kinematic chain is configured to determine simultaneous movement of the cutting station (400), the advancement system and the constraining station (200).

In a 151st aspect according to any one of the preceding aspects from 149, said kinematic chain is configured to determine simultaneous movement of the cutting station (400), the upstream advancement system (800), the auxiliary advancement system (950) and the constraining station (200).

An aspect 152 is directed to a method for making straws, wherein the method is performed by an apparatus according to any one of the preceding aspects from 1 to 91.

An aspect 153 is directed to a method for making straws, wherein the method is performed by an apparatus according to any one of the preceding aspects from 92 to 151.

An aspect 154 is directed to a method for making straws (50) performed by an apparatus (100; 200), the apparatus (100; 200) comprising a support structure (60; 600) defining an internal volume and bearing:

a feeding station (30; 300) configured for feeding a strip (1*a*) or at least one discrete sheet (1*b*) made of paper material along a feeding direction, said strip or discrete sheet extended:

lengthwise along a first direction substantially parallel to or coinciding with said feeding direction, and widthwise along a second direction orthogonal to said first direction between a first end portion (2) and a second end portion (3), a forming station (10; 101) comprising:

a conveyor (13; 130) extended lengthwise, along a winding axis, between an inlet portion (13*a*; 130*a*), configured for receiving the strip (1*a*) or the discrete sheet (1*b*), and an outlet portion (13*b*; 130*b*) configured for allowing the movement of the strip (1*a*) or discrete sheet (1*b*) exiting from said conveyor (13; 130), said winding axis defining a winding direction (WD) which extends from the inlet portion (13*a*; 130*a*) to the outlet portion (13*b*; 130*b*) of the conveyor (13; 130), said conveyor (13; 130) further comprising:

a base (15; 150) extended between the inlet portion (13*a*; 130*a*) and the outlet portion (13*b*; 130*b*) of the conveyor (13; 130), said base (15; 150) being configured for receiving in abutment the strip (1*a*) or the discrete sheet (1*b*);

a first lateral wall (16; 160) and a second lateral wall (17; 170), opposite each other and extended heightwise starting from said base (15; 150), said first and second lateral wall (16, 17; 160, 170) converging with respect to each other along said winding direction (WD);

a through opening (14; 140) situated at least at the outlet portion (13*b*; 130*b*) of the conveyor (13; 130), said through opening (14; 140) defining a passage section, optionally circular, laterally interposed between the first and the second lateral wall (16, 17; 160, 170), and vertically interposed between said base (15; 150) and a top wall (18; 180) opposite said base (15; 150);

wherein said conveyor (13; 130) is configured for:

receiving the strip (1*a*) or the discrete sheet (1*b*) optionally in substantially flat form at least at the inlet portion (13*a*; 130*a*), and winding said strip (1*a*) or discrete sheet (1*b*) around said winding axis to define a cylindrical body (5) made of paper material, wherein the first end portion (2) and the second end portion (3) face each other and are superimposed to define a mutual overlapping portion (4) at least at the outlet portion (13*b*; 130*b*), a winding body (11; 110) extended along a main axis (A) substantially parallel to or coinciding with said winding axis and configured for receiving in abutment said cylindrical body (5), said winding body (11; 110) traversing said passage opening (14; 140) of the conveyor (13; 130);

a constraining station (20; 201) configured for constraining, during a constraining step, the first end portion (2) with the second end portion (3) at least at the mutual overlapping portion (4) to define a straw (50) extended between a first and a second substantially circular free edges (51, 52), the constraining station (20; 201) being arranged downstream of the forming station (10; 101) and comprising at least a rotatable component configured to allow advancement of the cylindrical body (5) during said constraining step;

optionally a cutting station (40; 400) comprising at least one cutting tool (41; 410);

wherein the method comprises a manufacturing procedure (1000) performed by said apparatus (100; 200), said manufacturing procedure (1000) including at least the following steps:

advancing the strip (1*a*) or the discrete sheet (1*b*) along the advancement direction (AD), and simultaneously constraining the first end portion (2) with the second end portion (3) of the cylindrical body (5) by activating the constraining station (20; 201).

In a 155th aspect according to any one of the preceding aspects from 152, the step of activating the constraining station (20; 201) comprises activating a heating system (930) of the constraining station (20; 201).

In a 156th aspect according to any one of the preceding aspects from 152, the step of advancing the strip (1*a*) or the discrete sheet (1*b*) through the conveyor (13; 130) determines winding of the strip (1*a*) or discrete sheet (1*b*) around the winding axis.

In a 157th aspect according to any one of the preceding aspects from 152, the step of advancing the strip (1*a*) or the discrete sheet (1*b*) includes a step of commanding an electric motor of an advancement system of the apparatus (100; 200) to rotate.

In a 158th aspect according to the preceding aspect, the step of commanding the electric motor (830) includes activating rotation of the electric motor (830), wherein rotation of the electric motor determines, in particular throughout the entire manufacturing procedure, a simultaneous rotation:

of the rotatable component of the constraining station (20; 201) to move the cylindrical body (5) along the main axis of the winding body (11); and of the at least one advancement roller of the advancement system, in particular wherein the at least one advancement roller being arranged at:

an upstream advancement system (80) of the advancement system arranged upstream of the forming station and the cutting station; and/or at an auxiliary advancement system (950) arranged substantially at the forming station (10);

optionally of a cutting blade (41) of the cutting station (40).

In a 159th aspect according to any one of the preceding aspects from 152, during the manufacturing procedure (1000), the rotatable component of the constraining station (20; 201), the at least one advancement roller of the advancement system and optionally also the cutting blade (410) of the cutting station (400) rotate simultaneously in particular in a continuous manner.

In a 160th aspect according to any one of the preceding aspects from 152, during the steps of:

rotating the rotating blade (410) of the cutting station (400), advancing the strip or the discrete sheet along the advancement direction, and constraining the first end portion (2) with the second end portion (3) of the paper material, the forming station, the constraining station and optionally also the cutting station are simultaneously active on different portions of a continuous strip (1*a*) or on a one-piece of discrete sheet (1*b*).

In a 161st aspect according to the preceding aspect, the different portions of the continuous strip (1*a*) or of the one-piece of discrete sheet (1*b*) are aligned along the advancement direction (AD) set by the advancement system.

DETAILED DESCRIPTION

The following describes a method and apparatus for making straws according to different embodiments of the same invention.

Figure 2:
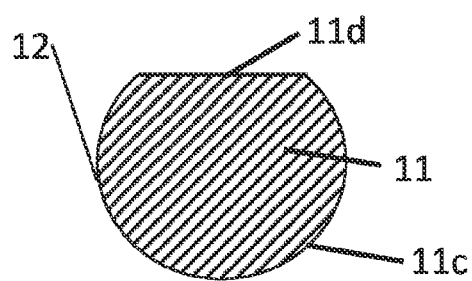
FIG. 2 is a cross-sectional view of the winding body of an apparatus for making straws according to the present invention.
Figure 3:
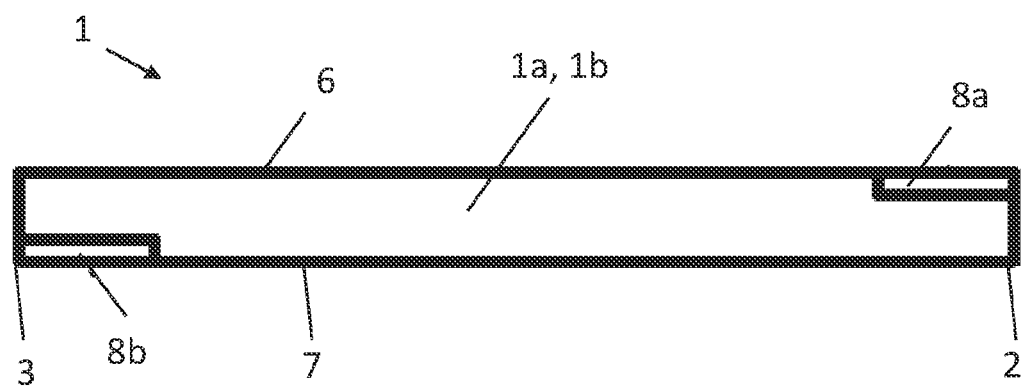
FIG. 3 is a sectional view of sheet material for making straws by means of an apparatus according to the present invention.

The following description discloses an apparatus 100 for making a straw 50 according to a first embodiment as shown in FIGS. 1-3. Furthermore, the following description discloses an apparatus 200 for making a straw 50 according to a second embodiment as shown in FIGS. 5-11. As indicated above, the apparatus 100; 200 is in fact a small benchtop machine for making paper straws one at a time and at direct request of the user/expert.

The following description is structured in such a way to describe the components of the apparatus in an order according to a working direction for making the straw.

In particular, the apparatus 100; 200 comprises a feeding station 30; 300, at least one advancement system 80, 90; 800, 900, a forming station 10; 101, a cutting station 40; 400, and optionally a straw ejection system to define an inline production of the straw.

Figure 7:
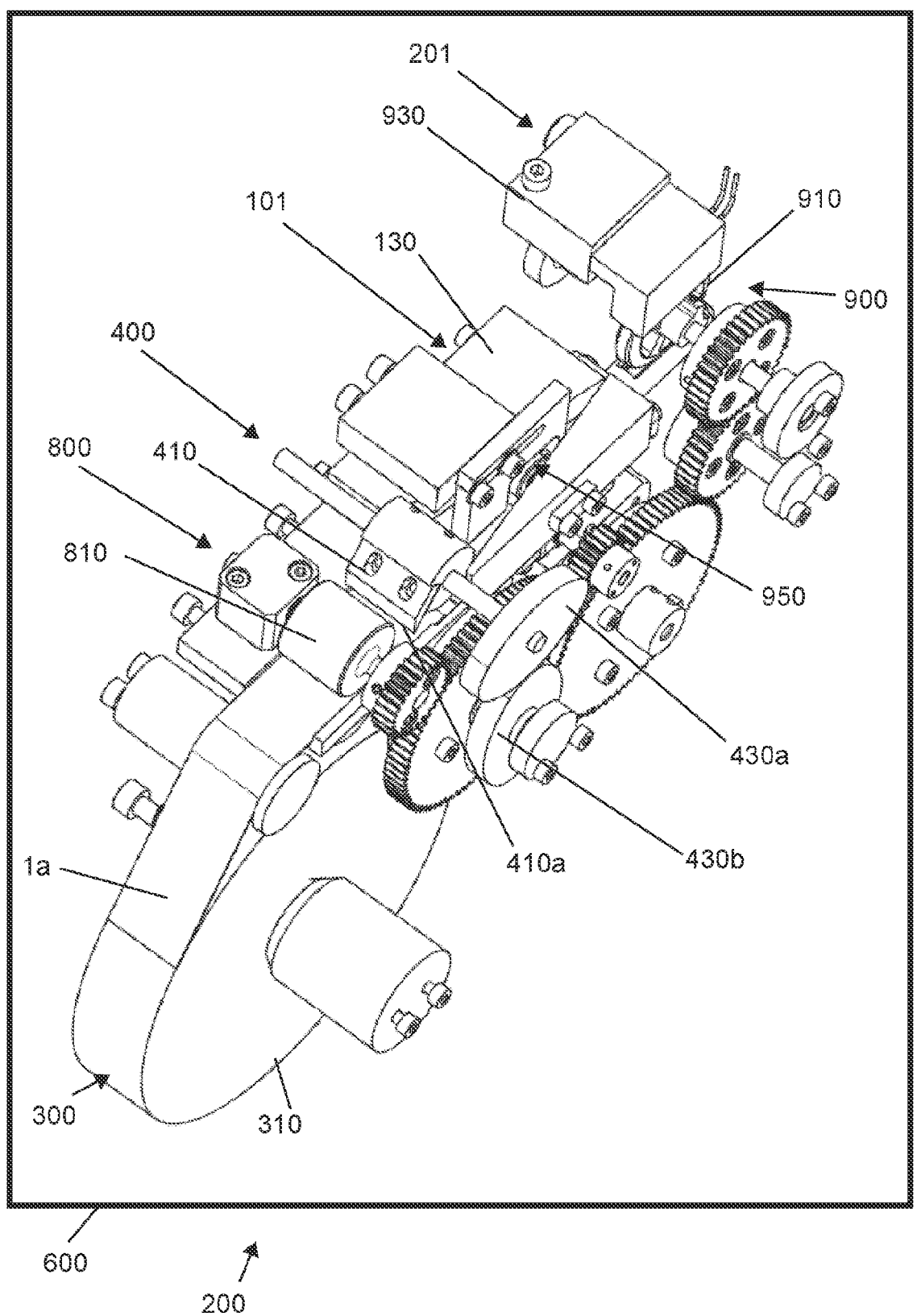
FIG. 7 is a top perspective view of an apparatus for making straws according to the further embodiment of the present invention.
Figure 8:
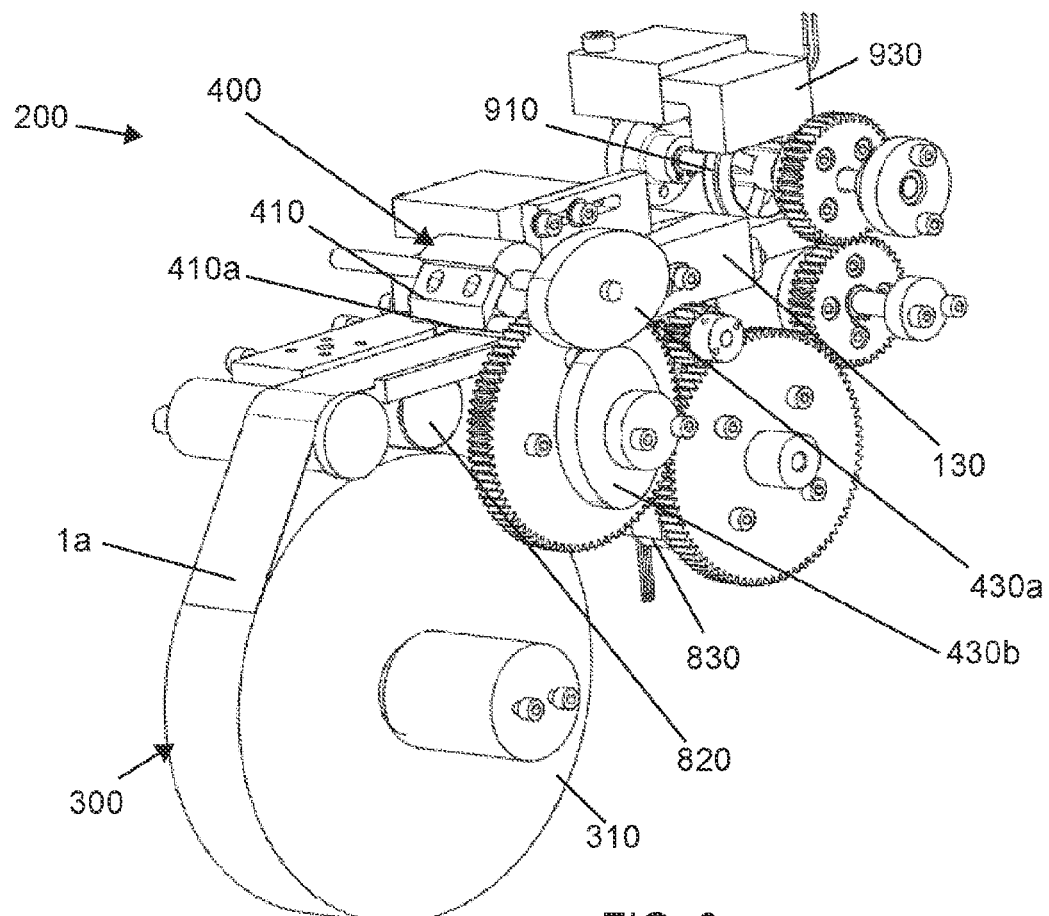
FIG. 8 is a side perspective view of an apparatus for making straws according to the further embodiment of the present invention, wherein the driving roller has been cancelled from the drawing to allow view of the cutting roller.
Figure 9:
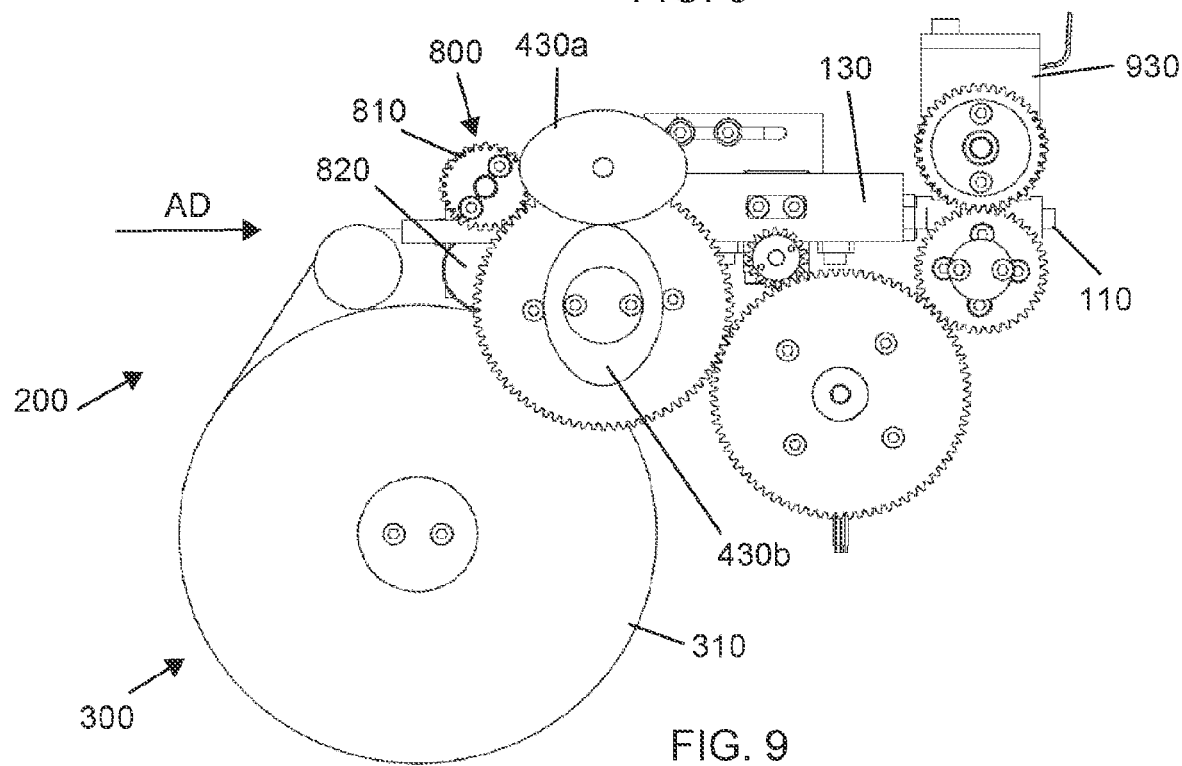
FIG. 9 is a side view of an apparatus for making straws according to the further embodiment of the present invention.

Apparatus 100; 200 comprises a support structure 60; 600 shown in FIGS. 1 and 7, defining an internal volume to house the components and the stations described below.

The support structure 60; 600 comprises at least one side wall, for example formed by four flat panels joined together, and a top wall connected to the side wall to limit an access to the internal volume by a user. The support structure 60; 600 may comprise a base wall connected to the side wall to define a substantially closed internal volume.

In a preferred embodiment, the support structure 60; 600 may be at least partly made of transparent material in such a way that a user can view the interior volume from the outside. In particular, the at least one side wall of the support structure 60 is at least partially made of transparent material, for example glass or plastic (Plexiglas).

Preferably the structure is compact so that it may be placed on any counter in a bar or similar commercial establishment and has a small size, e.g. included in one or more of the following dimensions:

a width of between 10 cm and 100 cm; and/or a length or depth of between 10 cm and 100 cm; and/or a height of between 10 cm and 100 cm.

The apparatus 100; 200 comprises a feeding station 30; 300 configured to hold or support a strip 1*a* or at least discrete sheets 1*b* of paper material and to move them along a feed direction.

The strip 1*a* or the discrete sheet 1*b* are made of a material suitable for contact with food and have a multilayer structure in thickness comprising a first layer of paper material and at least a second layer of plastic material bonded to the first paper layer, thereby making the strip or the discrete sheet impermeable at least to liquids. The layer of plastic material may comprise a thin film of polyethylene applied to one (polythene-coated paper) or both faces (bi-polythene-coated paper) of the strip or discrete sheet.

In one embodiment, it is planned to use a heat-sealable paper roll with the possibility of being printed with logos or various designs and colors.

The strip or discrete sheet extends in length along a first direction substantially parallel or coincident with the feed direction, and in width along a second direction orthogonal to the first direction between a first end portion 2 and a second end portion 3.

The width of the strip or discrete sheet is measured between an extremal edge of the first end portion 2 and an extremal edge of the second end portion 3.

Strip 1*a* or discrete sheet 1*b* also extends in thickness between an upper surface 6 and a lower surface 7 opposite each other. In order to make the straw sufficiently stiff, the strip or discrete sheet has a weight between 50 g/m$^2$ and 90 g/m$^2$.

In an embodiment shown in FIG. 3, the strip 1*a* or discrete sheet 1*b* comprises a first layer of adhesive material 8*a*, e.g., food adhesive, on the upper surface 6 and at the first end portion 2, and a second layer of adhesive material 8*b*, e.g., food adhesive, on the lower surface 7 and at the second end portion 3. Alternatively, the adhesive material may be affixed to only one of the first and second surfaces 6, 7 of the strip or discrete sheet.

The bonding material may comprise a heat-sealing material configured to determine adhesion between the first and second end portions of the paper material when subjected to high temperature, for example by means of a heat-sealing element. In such a case, the heat-sealing material may comprise plastic material bound to the paper layer, for example polyethylene film.

Alternatively, the adhesive material may include a cold adhesive material configured to determine adhesion between the first and second end portions of the paper material when subjected to pressure.

In a further embodiment, the strip or discrete sheet is made of poly or bi-polyester material as described above: a bonding step is then determined by thermo-welding as described below.

Figure 5:
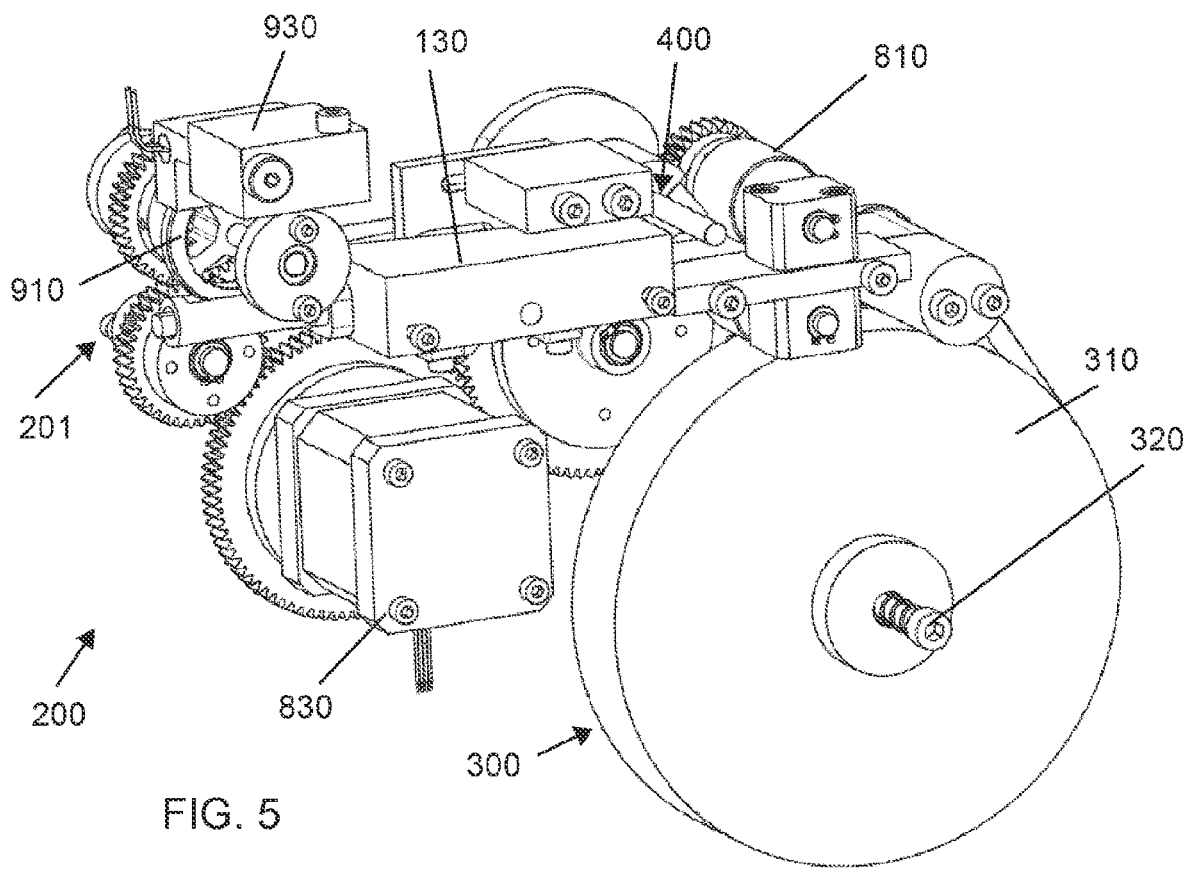
FIGS. 5 and 6 are side perspective views of an apparatus for making straws according to a further embodiment of the present invention.
Figure 6:
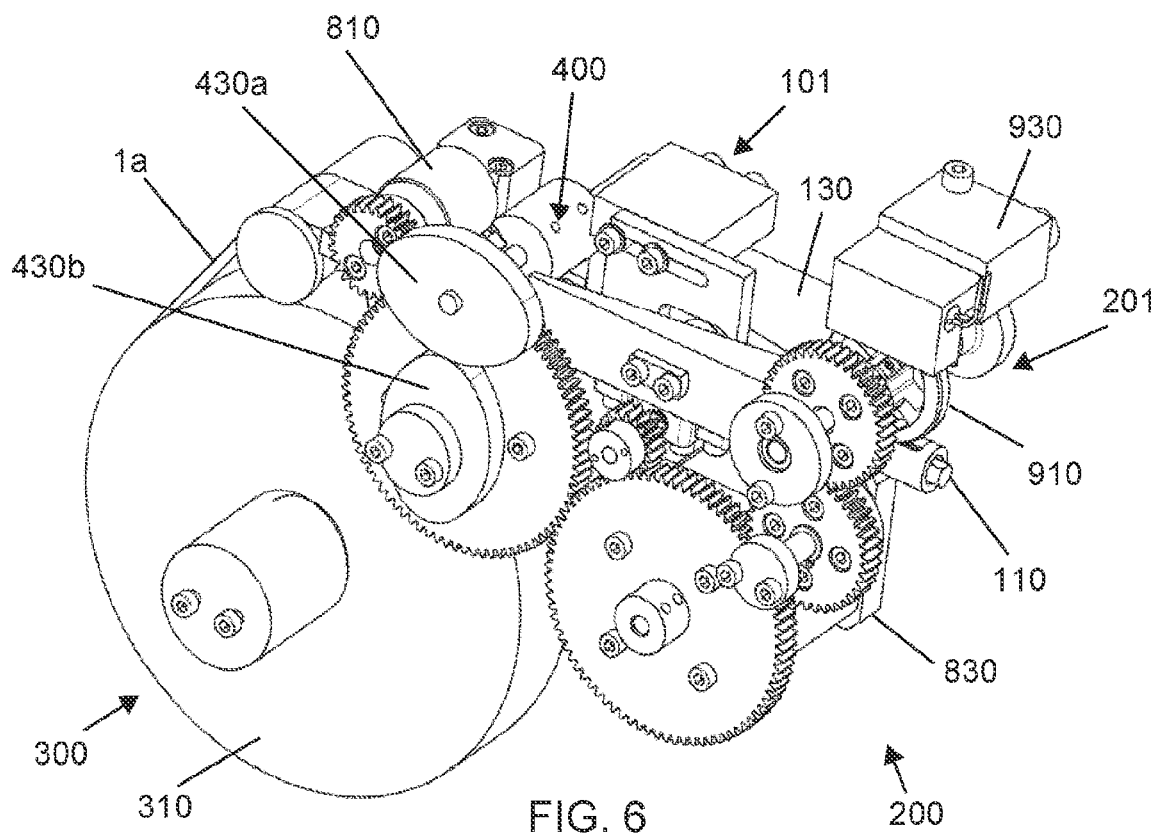

The feeding station 30; 300 includes at least one support 32; 320, as shown in FIGS. 1 and 5, configured to carry a reel 31; 310 of strip 1a and to allow it to rotate about a rotation axis B. The reel 31; 310, movable by rotation about the axis B, is configured to unwind consecutive portions of the strip 1a along an unwinding direction optionally coinciding with the feeding direction. In particular, the support 32; 320 is configured to accommodate a reel 31; 310 having the axis of rotation B orthogonal to the feeding direction and optionally orthogonal to an axis of the winding body 11 described below.

The feeding station 30; 300 may comprise a motor located at the support 32; 320 and, at least during an operating condition of the apparatus 100, operatively connected to the reel 31; 310: the motor may be configured to rotate the reel 31; 310 to unwind consecutive portions of the strip 1a. Although the FIGS. 5-11 relating to the second embodiment do not show a motor operatively connected to the reel 31; 310, the apparatus 200 may comprise said motor operatively connected to the reel 31; 310 and configured to rotate the reel.

Alternatively, the feeding station 30; 300 may comprise an idle support 32; 320, or it may comprise braked support configured to, at least during an operating condition of the apparatus, brake the rotation of the reel in order to maintain tension along the portion of the strip 1a turned.

The feeding station may comprise, alternatively to the support 32; 320 and according to the first and the second embodiment, a storage volume configured to accommodate a stack of discrete sheets (not shown in the accompanying figures) or a strip folded in overlapping layers to define a stack of continuous sheets. The above description is common for the first and the second embodiments described here below.

First Embodiment—Apparatus 100

Here below a description of the apparatus 100 according to a first embodiment, as shown in FIGS. 1-3, is provided.

The apparatus 100 may comprise an upstream advancement system 80 configured, during a condition of use of the apparatus, to contact the strip 1a or the discrete sheet 1b and to determine its advancement along the feeding direction and/or along the winding direction WD. The upstream advancement system 80 is arranged upstream of a conveyor 13 with respect to the feeding direction and/or the winding direction, and comprises at least one drive advancement roller configured, during a condition of use of the apparatus, to contact the strip 1a or the discrete sheet 1b and to determine its advancement along the feeding direction and/or along a winding direction WD of the paper material.

According to the embodiment shown in FIG. 1, the upstream advancement system 80 comprises a first and a second advancement roller 81, 82. The first advancement roller is movable by rotation about a first axis of rotation R1, and the second advancement roller is movable by rotation about a second axis of rotation R2: the first and second axis of rotation are parallel to each other and spaced apart.

The first and second advancement rollers 81, 82 may both be driven: alternatively, the first advancement roller may be driven and the second advancement roller may be idle and vice versa. In this regard, the feeding station 30 may comprise an electric motor operatively connected to the first and/or second advancement rollers, and configured to rotate the respective roller to determine a feed of the strip 1a or the discrete sheet 1b. For example, the motor may be connected to the first roller making it drive, while the second roller may be idle and act in opposition to the first roller.

The first and second advancement rollers 81, 82 comprise a respective outer surface 81a, 82a configured to contact the strip 1a or the discrete sheet 1b: this outer surface of the first advancement roller 81 faces the outer surface of the second advancement roller 82.

The outer surface of the first advancement roller 81 is then configured to contact the upper surface of the strip or discrete sheet, while the outer surface of the second advancement roller 82 is configured to contact the lower surface, and opposite the upper surface, of the strip or discrete sheet.

The first and second advancement rollers 82 are counter-rotating with each other to enable the sheet material to be advanced.

The apparatus 100 may further comprise an alignment structure 33 positioned downstream of the feeding station and upstream of the conveyor 13 subsequently described. In particular, the alignment structure 33 may be arranged substantially in correspondence with, in particular superimposed on, the upstream advancement system 80. The alignment structure 33 is configured to support and maintain in flat form the belt 1a or discrete sheet 1b being fed towards the conveyor 13.

In particular, the alignment structure 33 comprises a lower support 34 defining a support surface and configured to receive in support the strip 1a or the discrete sheet 1b. In an embodiment, the alignment structure 33 may further comprise an upper support 35 defining an auxiliary surface facing, at least partially, the support surface of the lower support 34. In particular, the auxiliary surface of the upper support 35 is substantially parallel to the support surface of the lower support 34.

The support surface and the auxiliary surface extend in length parallel to the winding direction WD, and in width along a transverse axis orthogonal to the extension in length.

Figure 1A:
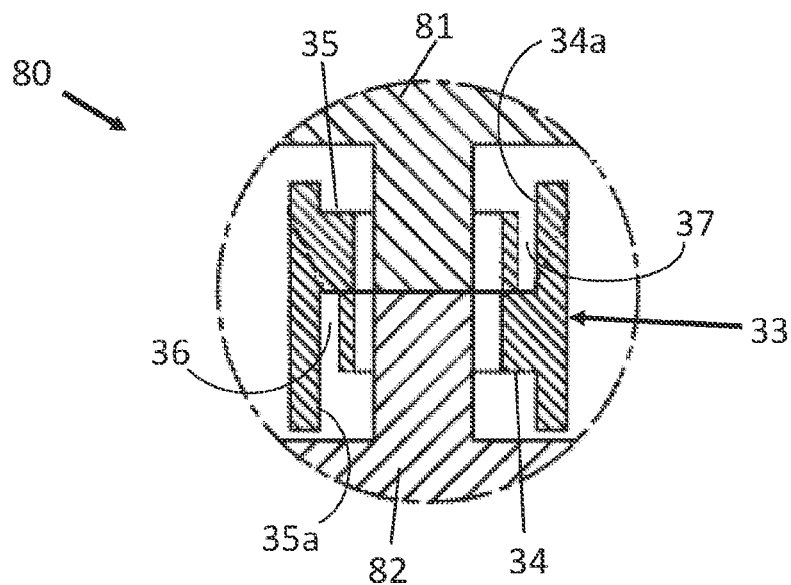
FIG. 1a is a sectional view of the alignment structure of an apparatus for making straws according to the present invention.

FIG. 1a shows a magnified sectional view of the alignment structure 33 combined with the upstream advancement system 80.

The lower support 34 comprises a first side wall 34a, optionally substantially orthogonal to the support surface, extending in length along a direction substantially parallel to the feed direction and/or the winding direction WD, and emerging in height substantially orthogonally from the support surface along a first direction, in particular opposite to the direction of the force of gravity.

Similarly, the upper support 35 comprises a second side wall 35a, optionally substantially orthogonal to the auxiliary surface, extending in length along a direction substantially parallel to the feed direction and/or the winding direction WD, and emerging in height substantially orthogonally from the auxiliary surface along a second direction substantially opposite to the first direction. The first and second sidewalls are opposed to each other to define an interposed distance: in particular, the distance between the first and second sidewalls 34a, 35a of the alignment structure 33 defines a passage width to allow passage of the strip 1a or the discrete sheet 1b along the feeding or winding direction. In particular, the passage width of the alignment structure 33 is equal to the width of the strip 1a or the discrete sheet 1b: alternatively the passage width is 1 mm or 2 mm greater than the width of the strip 1a or the discrete sheet 1b. For example, this width may be between 19 mm and 41 mm, in particular between 21 mm and 36 mm.

As shown in FIG. 1a, the support surface of the lower support 34 is only partially facing the auxiliary surface of the upper support 35. In other words, the support surface and the auxiliary surface are offset from each other along the transverse axis of the alignment structure 33, for example by a dimension S between 2 mm and 10 mm, to define a first gap 36 interposed between the support surface of the lower support 34 and the second side wall 35a of the upper support 35, and a second gap 37 interposed between the auxiliary surface of the upper support 35 and the first side wall 34a of the lower support 34. In other words, the width of the support surface and the width of the auxiliary surface are smaller than a gap interposed between the first side wall of the lower support and the second side wall of the upper support. The first and second gaps have a width between 2 mm and 10 mm.

The gap thereby allows the sheet material to avoid contact of the adhesive layer with the support surface and with the auxiliary surface: in fact, the adhesive on the lower surface of the strip 1a faces the first gap 36, while the adhesive, if existing, on the upper surface of the paper material faces the second gap 37. This solution allows avoiding contact between the adhesive and the alignment structure which would determine a brake to the advancement of the strip.

The apparatus also includes the forming station 10 located downstream of the feeding station 30 and optionally downstream, if present, of the upstream advancement system 80.

The forming station 10 comprises a conveyor 13 extending in length, along a winding axis, between an inlet portion 13a configured to receive the strip 1a or discrete sheet 1b, and an outlet portion 13b configured to allow the strip 1a or discrete sheet 1b to pass through as it exits the conveyor 13. The winding axis defines a winding direction WD extending from the inlet portion 13a towards the outlet portion 13b of the conveyor 13 as shown in FIG. 1.

Figure 4:
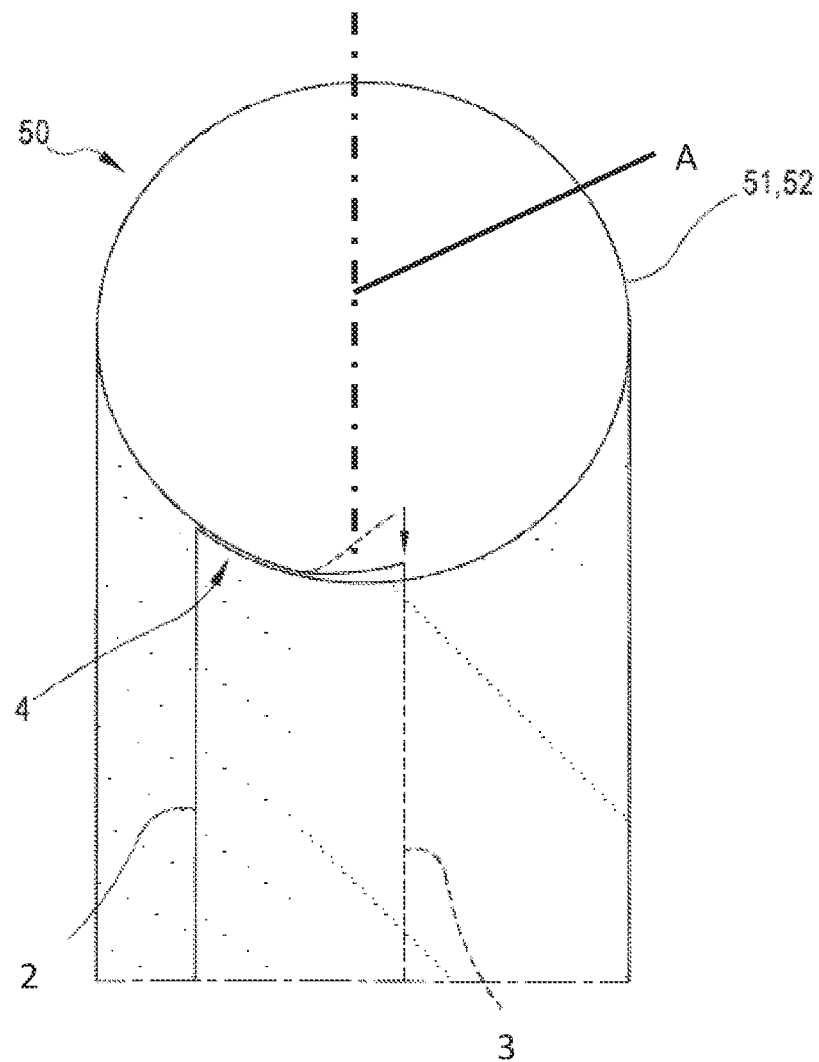
FIG. 4 is a perspective view of a straw made by means of an apparatus according to the present invention.

The conveyor 13 is then configured to receive the strip 1a or discrete sheet 1b in a substantially flat form, for example from the alignment structure or the feeding station, at the inlet portion 13a, and to wind the strip 1a or discrete sheet 1b around the winding axis 11 to define a cylindrical body 5 of paper material. The cylindrical body 5 defines a semi-finished product in which the first end portion 2 and the second end portion 3 are facing each other and overlapping each other, to define a mutually overlapping portion 4 at least at the outlet portion 13b. The mutual overlapping portion extends substantially parallel to the first and second end portions 2, 3. The straw 50 and the mutual overlapping portion are shown in FIG. 4.

The conveyor 13 includes a base 15 extending in length between the inlet portion 13a and the outlet portion 13b of the conveyor and configured to receive in support the strip 1a or the discrete sheet 1b. The base may be substantially flat in shape and optionally parallel or coincident with the support surface of the alignment structure 33. Alternatively, the base 15 may have an arcuate shape with a concavity facing a portion suitable to receive the paper material.

In an embodiment, the conveyor 13 comprises a first side wall 16 and a second side wall 17 extending in height from the base 15: the first and second side walls 16, 17 converge with each other along the WD winding direction.

The conveyor further comprises a through opening 14 located at the outlet portion 13b of the conveyor 13, wherein the through opening 14 defines a through section interposed laterally between the first and second side walls 17. The through opening 14 is further interposed vertically between the base 15 and a top wall 18 opposite the base 15. In an embodiment, the through opening defines a through section having a substantially circular shape, in particular a closed circular shape.

In particular, at the inlet portion 13a of the conveyor 13, the first side wall 16 and the second side wall 17 are spaced apart from each other, while at the outlet portion 13b of the conveyor 13, the first side wall 16 and the second side wall 17 are coincident with each other to define the top wall 18 of the through opening 14.

In other words, the conveyor 13 presents, along the winding direction, a funnel shape, such that the inlet portion 13a is greater in size than the through opening 14. In particular, the conveyor may have, along the winding direction, side walls having a spiral or snail shape closing towards the through opening 14.

The expressions "base" and "side walls" referring to the conveyor 13 are not to be understood as being limited to an embodiment in which the base and the side walls are visually or geometrically distinct: for example, in the case in which the conveyor has a funnel shape, the base and the side walls define a section, orthogonal to the winding axis, substantially circular, whose radius tends to reduce as it advances towards the winding direction approaching the through opening 14. In such an embodiment, the base and side walls define a continuous form in the absence of geometric discontinuities.

The side walls 16, 17 and the base 15 of the conveyor 13 can alternatively define, along the winding direction WD, a spiral, optionally a logarithmic spiral.

The internal shape of the conveyor is then configured to determine the winding of the paper material as it passes through the conveyor. In particular, the combination of the forward movement of the paper material along the winding direction and the passage of the paper material through the conveyor 13 determines the winding of the paper material around the winding axis.

It should also be noted that the conveyor 13, and in particular the portion of the conveyor 13 responsible for determining the winding of the paper material around the winding axis, is static: in particular, the conveyor 13 has no moving components, in particular with respect to the support structure 60, for determining the winding of the paper material. In other words, the tapered shape of the conveyor determines the winding of the sheet itself as it passes through the conveyor. In other words, the conveyor 13 is a passive component.

Figure 1B:
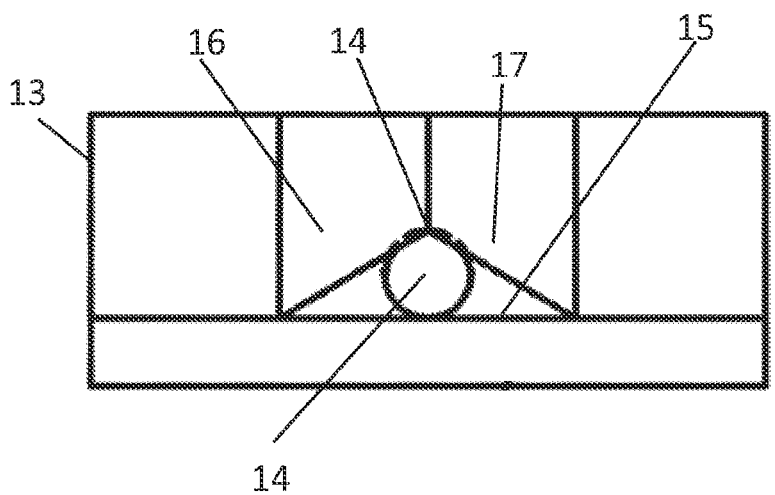
FIG. 1b is a front view of the conveyor of a straw-making apparatus according to the present invention.

In this regard, the internal shape of the conveyor can be described by referring in detail to the shape of the side walls 16, 17: FIG. 1b shows conveyor 13 from a front view aligned with the winding axis.

The first and second side walls 17 of the conveyor 13 have, at least in correspondence with the outlet portion 13b of the conveyor 13, an arcuate shape with respective concavities directed towards the base 15 of the conveyor 13: in particular, such arcuate shape of the first and second side walls 17 defines a respective first and second radius of curvature that reduces along the winding direction WD starting from the inlet portion 13a, or from an intermediate portion, of the conveyor 13 to the outlet portion 13b of the conveyor 13. The first and second radii of curvature of the first and second side walls 16, 17 respectively reduce in a constant manner along the winding direction WD, to define the aforementioned funnel shape. The first and second side walls 16, 17 of the conveyor 13 have a respective first and second inclination with respect to the base 15: in particular, the first and second inclination are reduced along the winding direction WD.

The first and second side walls 16, 17 of the conveyor 13 have a respective first and second maximum inclination in correspondence with the inlet portion 13a of the conveyor 13: said maximum inclination is preferably equal to 90°±10°. The first and second side walls 16, 17 of the conveyor 13 also have a respective first and second minimum inclination in correspondence with the outlet portion 13b of the conveyor 13: said minimum inclination is preferably equal to 0°. Note that the first and second maximum inclination are greater in value than the first and second minimum inclination.

The first and second inclinations respectively of the first and second side walls 16, 17 of the conveyor 13 vary in a constant manner with respect to an increment along the winding direction WD: the term constant indicates the fact that a 'first derivative' of the first and second inclinations, with respect to an increment along the winding direction WD, defines a continuous function.

In an embodiment, the first and second side walls 16, 17 may be, at least in correspondence with the outlet portion 13b of the conveyor 13, asymmetrical with respect to each other with respect to a plane passing through the winding axis and orthogonal to the base 15. For example, the first side wall 16 may have a different radius of curvature with respect to the radius of curvature of the second side wall 17 in correspondence with the outlet portion 13b. In other words, the passage section of the conveyor 13 has at least one axis of asymmetry, such that a portion of said passage section has a different concavity with respect to another portion of the passage section, defining a discontinuity: such a discontinuity may generate a step or a gap at least at the conveyor passage section 13.

The forming station 10 further comprises a winding body 11 extending along a main axis A, substantially parallel or coincident with the winding axis defined by the conveyor 13, between a first end portion 11a and a second end portion 11b. The winding body may have a cylindrical shape extending in length L and defining a circular section of radius R with respect to a plane orthogonal to the main axis A.

Alternatively, as shown in FIG. 2, the cylindrical body 11 may extend in length and have a semi-circular section, wherein a first section 11c of the semi-circular section has a circular shape with radius R1, and a second section 11d distinct and consecutive from the first section may have a rectilinear shape or a curved shape having a radius R2 different from the radius R1 of the first section. The second section, if rectilinear or semi-rectilinear, extends substantially along the entire length L of the winding body to define a substantially rectangular plane.

In a further embodiment, the winding body extends in length and defines a polygonal, e.g. square, rectangular, pentagonal, hexagonal, or octagonal cross-section relative to the main axis A.

The winding body 11 has, according to any of the previously described embodiments, a length of between 4 cm and 25 cm, in particular between 6 cm and 20 cm. Note that the extension in length of the winding body is essentially defined by a standard length of a straw.

In addition, the winding body 11 has a maximum radial dimension between 5 mm and 15 mm, more particularly between 6 mm and 11 mm, more particularly between 7 mm and 10 mm. In the case where the winding body is circular, the maximum radial dimension is defined by the diameter of the winding body orthogonally to the main axis A. Alternatively, if the winding body has a polygonal shape, the maximum radial dimension is defined by the envelope of the vertices of the polygon. In general terms, the maximum radial envelope essentially defines the radial envelope of the straw 50. In cases where the winding body is semicircular or polygonal in shape, the diameter of the straw may be slightly smaller than the maximum radial footprint.

The winding body can be made of metal material, for example steel, stainless steel or chrome-plated metal. Alternatively, the winding body can be made of polymer material. In addition, the winding body 11 can be made of composite material, e.g. metal and polymer material or glass or carbon fibre mixed with epoxy resin.

The winding body of the present invention is fixed in rotation, particularly during an operating condition of the apparatus for making the straw 50.

The winding body 11 is also fixed in translation, in particular along the main axis A and along an axis orthogonal to the main axis A, during an operating condition of the apparatus for making the straw 50.

The winding body 11 is at least partially inserted in the exit opening of the conveyor, such that a portion of the winding body is inside the conveyor, and a portion is outside the conveyor 13. In particular, the first end portion 11a is arranged upstream of the passage section of the conveyor 13 according to the winding direction WD, while the second end portion 11b is arranged downstream of the conveyor 13 according to the winding direction WD and spaced from the through opening 14. In detail, the first end portion 11a is arranged between the first and second side walls 17 of the conveyor 13. It should also be noted that the majority of the winding body extends outside the conveyor such that if the first end portion 11a is placed at a distance P1 relative to the exit portion of the conveyor 13, and the second end portion 11b is placed at a distance P2 relative to the exit portion of the conveyor 13, then P2>P1: in particular P2 may be at least twice or three times as large as P1.

As the winding body 11 is inserted into the conveyor and extends along the winding axis WD, the cylindrical body 5 exiting the conveyor is wrapped around the winding body.

It should also be noted that the passage opening of the conveyor 13 has a larger dimension than the radial dimension of the winding body 11, in order to allow the winding body to be inserted within the passage opening and to allow the strip material 1a or the discrete sheet to be interposed between the conveyor and the winding body.

In other words, during a winding phase, the strip 1a or the discrete sheet 1b passes through the winding conveyor 13, wraps around the winding axis during this crossing along the winding direction, transits between the winding conveyor 13 and the winding body 11, and exits the winding conveyor 13 at the exit portion 13b wrapped around the winding body 11 to define the cylindrical body 5.

The winding body 11 may be removed from the conveyor 13 during an apparatus maintenance condition: in particular, the winding body 11 may be removed by pulling it out of the through opening 14.

Figure 1C:
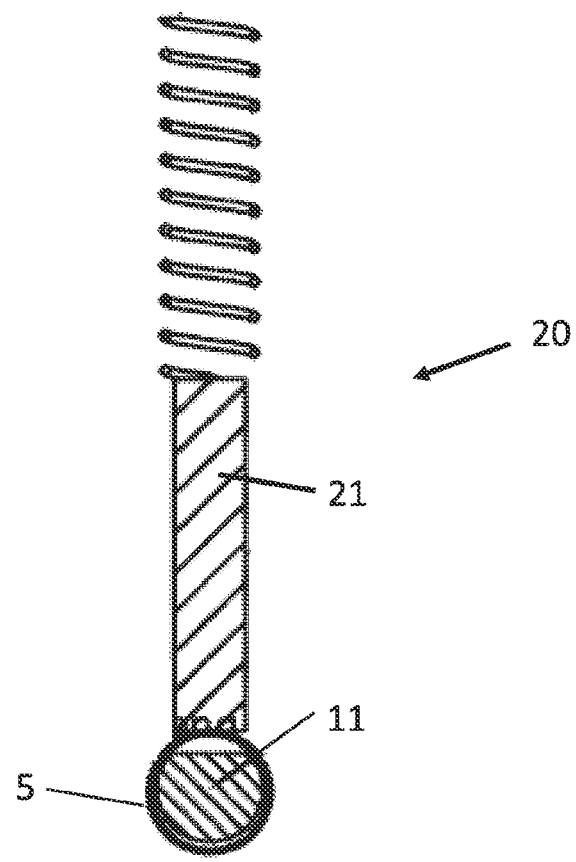
FIG. 1c is a cross-sectional view of the constraining station of a straw-making apparatus according to the present invention.

The apparatus further comprises a constraining station 20, shown in a sectional view in FIG. 1c, configured to constrain the first end portion 2 with the second end portion 3 at the mutual overlapping portion 4. The constraining station 20 is located downstream of the conveyor 13 with respect to the winding direction.

The constraining station 20 may include a heat-sealing element 21 configured to contact at least a portion of the mutual overlapping portion 4, such that the mutual overlapping portion 4 is interposed between the heat-sealing element 21 and the winding body 11.

The heat-sealing element 21 may be movable along a direction parallel to the winding body 11: in this case, the heat-sealing element 21 is configured to slide, for example along a guide, parallel to the winding body 11 to heat-seal consecutive portions of the paper material. In this regard, the constraining station 20 may comprise an actuator 29 connected to the heat-sealing element 21 and configured to control its movement during at least one step of constraining the first end portion with the second end portion of the paper material.

Alternatively, or in addition to movement along the winding body, the heat-sealing element may be movable along a direction perpendicular to the winding body 11: an actuator may be connected to the heat-sealing element 21 and configured to control its movement between a distal position, whereby the winding body 11 and the heat-sealing element 21 are spaced apart from each other, and a close position, whereby the winding body 11 and the heat-sealing element 21 are close to each other or in contact.

During a heat-sealing step, the heat-sealing element 21 is configured to exert a thrust on the mutual coupling portion 4 when the latter is interposed between the heat-sealing element 21 and the winding body 11. More specifically, the heat-sealing element 21 is a heat-sealing bar extending at least partially along the main axis A of the winding body 11 and facing the latter.

According to an alternative embodiment to the heat-sealing element described above, the constraining station comprises a thrust element arranged downstream of the conveyor and configured to exert a thrust on the mutual overlap portion as the latter is interposed between the winding body 11 and the thrust element. The thrust element is movable along a direction perpendicular to the winding body 11, in particular orthogonal to the main axis A of the winding body 11: an actuator may be connected to the thrust element 21 and configured to control its movement between a distal position, wherein the winding body 11 and the thrust element 21 are spaced apart from each other, and a close position, wherein the winding body 11 and the thrust element 21 are adjacent to each other or in contact with each other so as to exert said thrust on the mutually overlapping portion. The thrust element is not a thermo-welding element and is not configured, and has no means, to raise its temperature. In this embodiment, the bonding material applied to the strip or discrete sheet is preferably cold bonding material.

According to a further embodiment, the constraining station 20 comprises an adhesion roller facing the winding body 11 and movable by rotation about its own axis, wherein this axis is fixed and orthogonal to the main axis A of the winding body 11. The adhesion roller is configured to:
  contact and push on the mutual overlap portion 4 of the cylindrical body 5 made of paper material during an operating condition of the apparatus;
  allow or determine the advancement of the paper material along the winding direction;
  optionally heat the adhesive material on the mutual overlap portion, in particular the adhesion roller defining a heat-sealing element.

The adhesion roller may comprise a heating element configured to heat, in particular up to a heat-sealing temperature, at least one circumferential surface of the adhesion roller suitable for contacting the sheet material. In such a case, the adhesion roller defines a heat-sealing element.

The constraining station may also include a motor operatively connected to the adhesion roller and configured to rotate the adhesion roller to contribute to or cause the paper material to advance along the main axis of the winding body 11.

The apparatus may comprise a downstream advancement system 90 arranged downstream of the conveyor 13 with respect to the winding direction WD. Optionally, the downstream advancement system 90 may be arranged downstream of the constraining station 20, such that the constraining station 20 is interposed between the conveyor and the downstream advancement system 90.

The downstream advancement system 90 comprises at least one drive roller 91 configured to contact the cylindrical body 5 or the straw 50 in sheet material, so as to pull it along a direction defined by the main axis A of the winding body away from the conveyor 13. The drive roller 91 comprises an outer surface facing the winding body 11, such that the paper material is interposed, during an operating condition, between the outer surface of the drive roller 11 and the winding body 11. In particular, the outer surface of the drive roller is configured to contact the strip 1a or the discrete sheet 1b to determine its advancement.

The downstream advancement system 90 comprises at least one electric motor operatively connected to the drive roller 91 and configured to rotate the drive roller to drive the cylindrical body 5 or the straw 50 along the main axis A.

In an embodiment, the advancement determined by the drive roller 91 allows the straw to be ejected outside the support structure 60 through the window 61.

The apparatus may further comprise a cutting station 40 comprising at least one cutting tool of choice between a rotating or translating blade 41 and configured to define a cut on at least a portion of the strip 1a or discrete sheet 1b. The cut may be transverse, for example perpendicular, with respect to the feeding direction or the winding direction WD of the strip 1a. In particular, the cut direction may be orthogonal to the main axis A of the winding body 11.

The cutting station 40 comprises an actuator configured to move the cutting tool along a direction perpendicular to the main axis A of the winding body 11.

In one embodiment, the cutting station 40 is interposed between the feeding station 30 and the conveyor 13, as shown schematically in FIG. 1. In such an embodiment, the conveyor 13 is arranged just downstream of the cutting station 40: in particular, the cutting station 40 and the conveyor 13 may be substantially consecutively adjacent, such that a small distance is interposed between the conveyor 13 and the cutting station 40. Optionally, the cutting station and the conveyor may be substantially in contact.

In particular, the cutting station 40 is interposed between the feeding station 30 and the alignment structure 33, as shown schematically in FIG. 1. In such an embodiment, the alignment structure 33 is arranged just downstream of the cutting station 40: in particular, the cutting station 40 and the alignment structure 33 may be substantially consecutively adjacent, such that a small distance is interposed between the alignment structure 33 and the cutting station 40, for example less than 30 mm or 20 mm. Optionally, the cutting station and the conveyor may be substantially in contact.

Alternatively, the cutting station may be arranged downstream with respect to the downstream advancement system 90: in such a case, the cutting station may act downstream of the winding body 11, for example so as to allow a cut, either guillotine or rotary blade, through the entire section of the straw 50. In order to allow the ejection of the straw, the cut may be performed when the straw emerges at least partially outside the support structure 60 through the window 61.

Alternatively, an ejection system comprising at least one respective roller may be arranged downstream of the cutting station 20. In particular, the ejection system is arranged downstream with respect to the downstream advancement system 90 and configured to move the straw along the main axis A to cause it to be ejected from the support structure. In such embodiment, the cutting station 40 may be interposed between the downstream advancement system 90 and the ejection system.

The apparatus may comprise a control unit 70 connected to at least one of the constraining station 20 and at least one of the upstream advancement system 80 and the downstream advancement system 90. The control unit may further be operatively connected to the feeding station 30 and/or the cutting station 40.

The control unit 70 may be configured to activate at least one of the upstream advancement system 80 and the downstream advancement system 90 to determine the movement of the advancing strip or discrete sheet along the winding direction WD. The advancing phase of the paper material through the conveyor 13 determines the winding of the strip or discrete sheet around the winding axis. The control unit is then configured to activate the constraining station 20 to constrain the first end portion 2 with the second end portion 3 at the mutual overlapping portion 4 to define the straw 50.

The control unit 70 may also be configured to, if the feeding station 30 includes a motor, control the feeding station 30 to set up consecutive portions of strip 1a or discrete sheets 1b being fed to the conveyor or upstream advancement system 80.

The control unit 70 may also be configured to activate the cutting station 40 to define the cutting of the strip 1a: the step of activating the cutting station 40 can be before, at the same time or after the step of activating the constraining station 20.

According to an embodiment, the control unit 70 is configured to perform a straw manufacturing procedure 50 comprising the following steps, optionally performed in the following order:

Commanding the feeding station 30 to move the strip 1a in feed towards and through the conveyor 13 and/or activating the upstream advancement system 80 to move the strip 1a in feed towards and through the conveyor 13, in particular the phase of commanding the feeding station 30 including the phase of driving the motor of the feeding station 30, and in which the movement of the strip to and through conveyor 13 causes the paper material to be wound around the winding axis;

activating cutting station 40 to define the cut of strip 1a, where cutting station 40 is interposed between feeding station 30 and forming station 10, in particular between feeding station 30 and alignment structure 33, the cutting step defining a length of the straw 50;

activating the constraining station 20 to determine the constraint between the first and second end portions 2, 3 of the paper material;

optionally activating the downstream advancement system 90 to move the straw 50 forward out of the support structure 60 through the window 61.

In a further embodiment according to the first embodiment, the apparatus comprises a control unit 70 configured to perform a straw manufacturing procedure 50 comprising the following steps optionally performed in the following order:

activating the downstream advancement system 90 to drive strip 1a to and through conveyor 13, in particular the step of activating the downstream advancement system 90 including the step of driving the motor connected to the drive roller of the downstream advancement system 90, in which the movement of the strip to and through conveyor 13 causes the paper material to be wound around the winding axis;

activating the constraining station 20 to determine the constraint between the first and second end portions 2, 3 of the paper material;

optionally activating the cutting station 40 to define the cutting of the strip 1a, where the cutting station 40 is arranged downstream of the downstream advancement system 90, in particular where the cutting station 40 is interposed between the downstream advancement system 90 and the ejection system, the cutting step defining the length of the straw 50.

In the event that the apparatus includes the ejection system, the above procedure further comprises a step of activating the ejection system to advance the straw 50 out of the support structure 60 through the window 61.

According to the above-mentioned further embodiment, the manufacturing procedure comprises a step, following a reel change step 31 or following an initial strip set-up phase within the apparatus, of manually guiding strip 1a through conveyor 13 along the winding direction, and Commit belt 1a to the downstream advancement system 90 in such a way that a rotation of the drive roller causes a simultaneous advancement of the strip 1a.

The support structure 60 defines an enclosure containing the feeding station 30, the forming station 10, and the constraining station 20. In addition, the inner volume may house one or more of the upstream advancement system 80, the downstream advancement system 90, the cutting station 40, and the control unit 70.

Second Embodiment—Apparatus 200

Here below a description of the apparatus 200 according to a second embodiment, as shown in FIGS. 5-11, is provided.

The first and the second embodiments both refer to apparatuses for manufacturing straws 50, as the one shown in FIG. 4: in other terms, the straw of FIG. 4 may be made by both the apparatus 100, 200 according to the first and second embodiment.

The apparatus 200 of the second embodiment comprises components in common the apparatus 100 of the first embodiment: in particular the apparatus 200 of the second embodiment comprises a feeding station 300 providing the strip 1a or the discrete sheet 1b as the feeding station 30 previously described. Thus, for sake of conciseness, the features referring to the feeding station 30 of the first embodiment and to the strip and discrete sheet previously described also belong to the feeding station 300 of the apparatus 200 of the second embodiment. Preferably, the feeding station 300 of the apparatus 200 of the second embodiment may be idle.

The apparatus 200 comprises an advancement system configured to determine an advancement of the strip 1a or of the discrete sheet 1b along an advancement direction AD. In particular the advancement system is configured to advance the strip 1a or of the discrete sheet 1b from the feeding station 300 through the forming station 101 and up to the constraining station 201. The advancement system may comprise at least one advancement roller 810, 820, 910, 910a, 910b, 950 and an electric motor 830 operatively connected to the advancement roller. The electric motor 830 is configured to rotate the advancement roller to determine the advancement of the strip 1a or of the discrete sheet 1b along the advancement direction AD. A kinematic chain may be provided as connection between the electric motor 830 and the at least one advancement roller: for example the kinematic chain may comprise teeth gears engaging each other or pulleys connected by a chain or a belt or a teeth belt.

The advancement system may comprise an upstream advancement system 800 configured, during a condition of use of the apparatus, to contact the strip 1*a* or the discrete sheet 1*b* and to determine its advancement along the feeding direction and/or along the winding direction WD. The upstream advancement system 800 is arranged upstream of a conveyor 130 with respect to the feeding direction and/or the winding direction, and comprises at least one drive advancement roller 810, 820 configured, during a condition of use of the apparatus, to contact the strip 1*a* or the discrete sheet 1*b* and to determine its advancement along the feeding direction and/or along a winding direction WD of the paper material.

In particular, the upstream advancement system 800 comprises a first advancement roller 810 and a second advancement roller 820. The first advancement roller 810 is movable by rotation about a first axis of rotation, and the second advancement roller is movable by rotation about a second axis of rotation: the first and second axis of rotation are parallel to each other and spaced apart. In particular the first and second axis of rotation of the first and second advancement rollers 810, 820 are substantially orthogonal to the advancement direction AD.

Notably, the advancement direction AD is substantially coincident with the feeding direction and/or with the winding direction.

The first and second advancement rollers 810, 820 may both be driven by a dedicated electric motor (not shown in the attached figures). Alternatively, the first advancement roller may be driven by the dedicated electric motor and the second advancement roller may be idle and vice versa. In this regard, the feeding station 300 may comprise an electric motor operatively connected to the first and/or second advancement rollers, and configured to rotate the respective roller to determine a feed of the strip 1*a* or the discrete sheet 1*b*. For example, the motor may be connected to the first roller making it rotate, while the second roller may be idle and act in opposition to the first roller.

In the embodiment shown in FIGS. 5-11, the first advancement rollers 810 is operatively connected to the electric motor 830 through a kinematic chain, while the second advancement roller 820 is idle. This kinematic chain may comprise teeth gears or a belt or a teeth belt, preferably timing belts comprising teeth to keep angular synchronization between the electric motor 930 and the rollers.

The first and second advancement rollers 810, 820 comprise a respective outer surface configured to contact the strip 1*a* or the discrete sheet 1*b*: this outer surface of the first advancement roller 810 faces the outer surface of the second advancement roller 820. In particular the outer surface of the first advancement roller 810 is configured to contact the upper surface of the strip or discrete sheet, while the outer surface of the second advancement roller 820 is configured to contact the lower surface, and opposite the upper surface, of the strip or discrete sheet.

The first and second advancement rollers 810, 820 are counter-rotating with each other to enable the sheet material to be advanced.

The apparatus 200 may further comprise an alignment structure analogous to the alignment structure 33 of the apparatus 100 of the first embodiment. The alignment structure may be positioned downstream of the feeding station 300 and upstream of the conveyor 130. Optionally, the alignment structure may be arranged substantially at, in particular superimposed on, the upstream advancement system 800. The alignment structure is configured to support and maintain in flat form the strip 1*a* or discrete sheet 1*b* being fed towards the conveyor 130.

For the details about the alignment structure, please refer to the description provided according to the first embodiment.

The apparatus also includes the forming station 101 located downstream of the feeding station 300 and optionally downstream, if present, of the upstream advancement system 800. The forming station 101 is configured to wind the paper material to define the cylindrical body 5.

Figure 10:
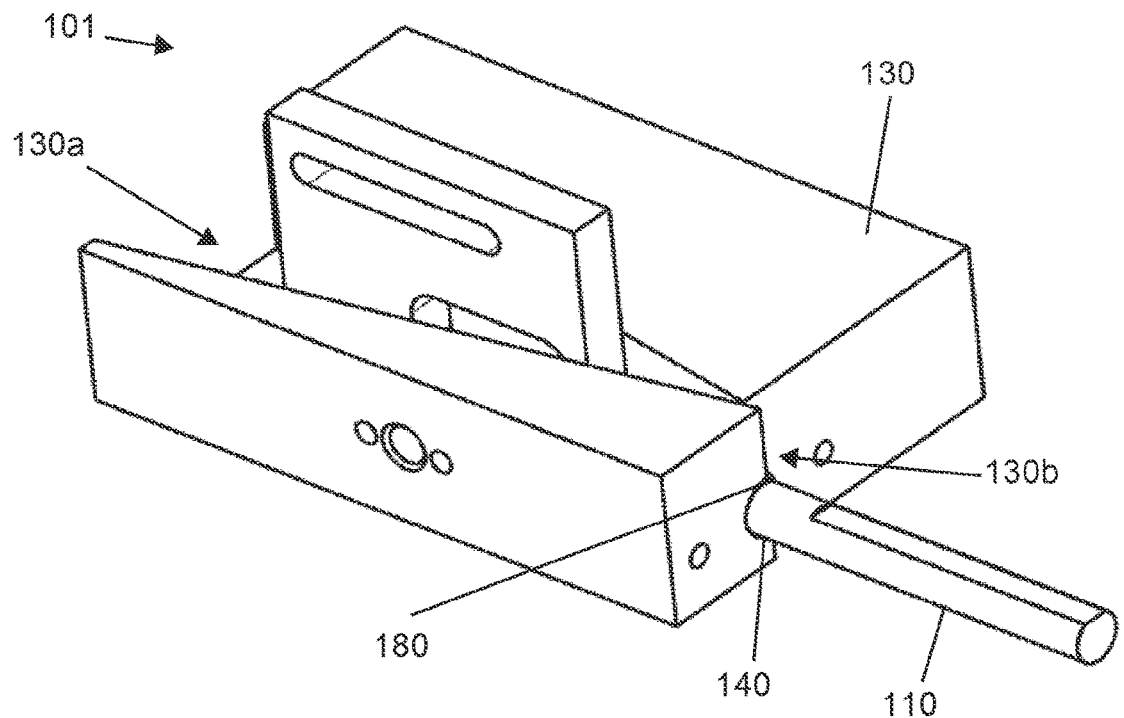
FIG. 10 is a perspective view of a forming station according to the further embodiment of the present invention.
Figure 11:
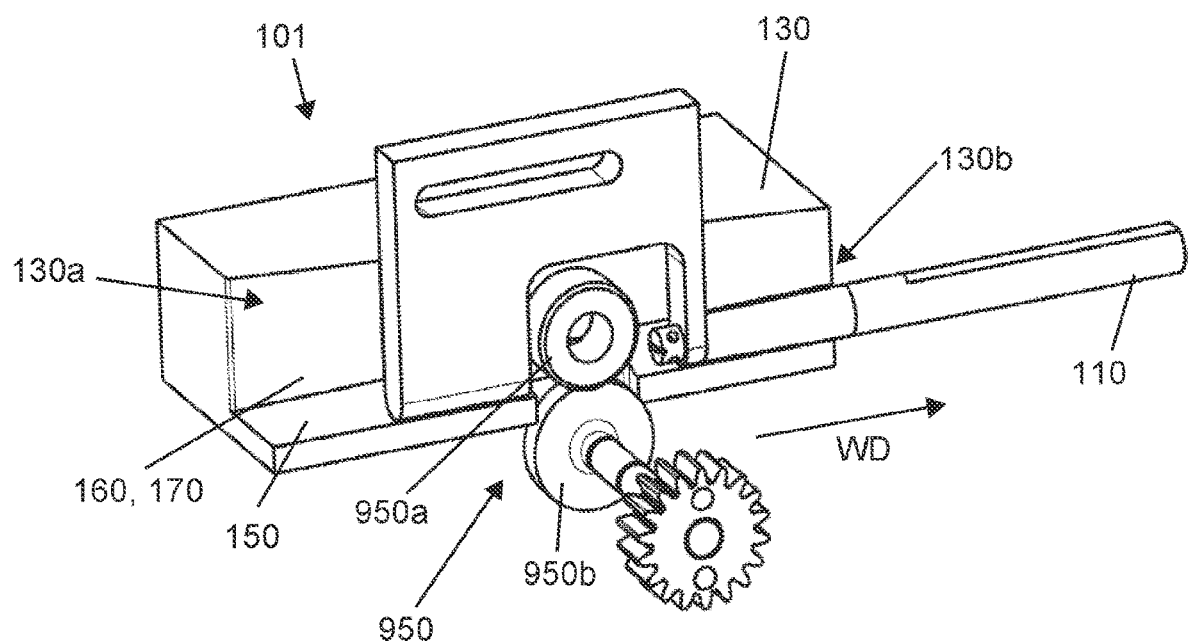
FIG. 11 is a perspective view of a forming station according to the further embodiment of the present invention, wherein a portion of the conveyor has been cancelled from the drawing to allow view of the wing body, the internal surface of the conveyor and of the driving rollers.

The forming station 101 comprises the conveyor 130 extending in length, along a winding axis, between an inlet portion 130*a* configured to receive the strip 1*a* or discrete sheet 1*b*, and an outlet portion 130*b* configured to allow the strip 1*a* or discrete sheet 1*b* to pass through as it exits the conveyor 130. The winding axis defines a winding direction WD extending from the inlet portion 130*a* towards the outlet portion 130*b* of the conveyor 130 as shown in FIGS. 10 and 11.

The conveyor 130 is then configured to receive the strip 1*a* or discrete sheet 1*b* in a substantially flat form, for example from the alignment structure or the feeding station, at the inlet portion 130*a*, and to wind the strip 1*a* or discrete sheet 1*b* around the winding axis 110 to define a cylindrical body 5 of paper material. The cylindrical body 5 defines a semi-finished product in which the first end portion 2 and the second end portion 3 are facing each other and overlapping each other, to define a mutually overlapping portion 4 at least at the outlet portion 130*b*. The mutual overlapping portion extends substantially parallel to the first and second end portions 2, 3. The straw 50 and the mutual overlapping portion made by the apparatus 200 are shown in FIG. 4.

The conveyor 130 includes a base 150 extending in length between the inlet portion 130*a* and the outlet portion 130*b* of the conveyor and configured to receive in support the strip 1*a* or the discrete sheet 1*b*. The base may be substantially flat in shape and optionally parallel or coincident with the support surface of the alignment structure. Alternatively, the base 150 may have an arcuate shape with a concavity facing a portion suitable to receive the paper material.

The conveyor 130 comprises a first side wall 160 and a second side wall 170 extending in height from the base 150: the first and second side walls 160, 170 converge with each other along the WD winding direction. The conveyor further comprises a through opening 140 located at the outlet portion 130*b* of the conveyor 130, wherein the through opening 140 defines a through section interposed laterally between the first and second side walls 170. The through opening 140 is further interposed vertically between the base 150 and a top wall 180 opposite the base 150. In an embodiment, the through opening defines a through section having a substantially circular shape, in particular a closed circular shape.

In particular, at the inlet portion 130*a* of the conveyor 130, the first side wall 160 and the second side wall 170 are spaced apart from each other, while at the outlet portion 130*b* of the conveyor 130, the first side wall 160 and the second side wall 170 are coincident with each other to define the top wall 180 of the through opening 140.

In other words, the conveyor 130 has, along the winding direction, a funnel shape, such that the inlet portion 130*a* is greater in size than the through opening 140. In particular, the conveyor may have, along the winding direction, side walls having a spiral or snail shape closing towards the through opening 140.

The expressions "base" and "side walls" referring to the conveyor 130 are not to be understood as being limited to an embodiment in which the base and the side walls are visually or geometrically distinct: for example, in the case in which the conveyor has a funnel shape, the base and the side walls define a section, orthogonal to the winding axis, substantially circular, whose radius tends to reduce as it advances towards the winding direction approaching the through opening 140. In such an embodiment, the base and side walls define a continuous form in the absence of geometric discontinuities.

The side walls 160, 170 and the base 150 of the conveyor 130 can alternatively define, along the winding direction WD, a spiral, optionally a logarithmic spiral.

The internal shape of the conveyor is then configured to determine winding of the paper material as it passes through the conveyor. In particular, the combination of the forward movement of the paper material along the winding direction and the passage of the paper material through the conveyor 130 determines the winding of the paper material around the winding axis.

It should also be noted that the conveyor 130, and in particular the portion of the conveyor 130 responsible for determining the winding of the paper material around the winding axis, is static: in particular, the conveyor 130 has no moving components, in particular with respect to the support structure 600, for determining the winding of the paper material. In other words, the tapered shape of the conveyor determines the winding of the sheet itself as it passes through the conveyor. In other words, the conveyor 130 is a passive component.

In this regard, the internal shape of the conveyor can be described by referring in detail to the shape of the side walls 160, 170, as shown in FIG. 11.

The first and second side walls 160, 170 of the conveyor 130 have, at least in correspondence with the outlet portion 130*b* of the conveyor 130, an arcuate shape with respective concavities directed towards the base 150 of the conveyor 130: in particular, such arcuate shape of the first and second side walls 170 defines a respective first and second radius of curvature that reduces along the winding direction WD starting from the inlet portion 130*a*, or from an intermediate portion, of the conveyor 130 to the outlet portion 130*b* of the conveyor 130. The first and second radii of curvature of the first and second side walls 160, 170 respectively reduce in a constant manner along the winding direction WD, to define the aforementioned funnel shape.

The first and second side walls 160, 170 of the conveyor 130 have a respective first and second inclination with respect to the base 150: in particular, the first and second inclination are reduced along the winding direction WD.

The first and second side walls 160, 170 of the conveyor 130 have a respective first and second maximum inclination in correspondence with the inlet portion 130*a* of the conveyor 130: said maximum inclination is preferably equal to 90°±10°. The first and second side walls 160, 170 of the conveyor 130 also have a respective first and second minimum inclination in correspondence with the outlet portion 130*b* of the conveyor 130: said minimum inclination is preferably equal to 0°. Note that the first and second maximum inclination are greater in value than the first and second minimum inclination.

The first and second inclinations respectively of the first and second side walls 160, 170 of the conveyor 130 vary in a constant manner with respect to an increment along the winding direction WD: the term constant indicates the fact that a 'first derivative' of the first and second inclinations, with respect to an increment along the winding direction WD, defines a continuous function.

In an embodiment, the first and second side walls 160, 170 may be, at least in correspondence with the outlet portion 130*b* of the conveyor 130, asymmetrical with respect to each other with respect to a plane passing through the winding axis and orthogonal to the base 150. For example, the first side wall 160 may have a different radius of curvature with respect to the radius of curvature of the second side wall 170 in correspondence with the outlet portion 130*b*. In other words, the passage section of the conveyor 130 has at least one axis of asymmetry, such that a portion of said passage section has a different concavity with respect to another portion of the passage section, defining a discontinuity: such a discontinuity may generate a step or a gap at least at the conveyor passage section 130.

The forming station 101 further comprises the winding body 110 extending along a main axis A, substantially parallel or coincident with the winding axis defined by the conveyor 130, between a first end portion and a second end portion. The winding body may have a cylindrical shape extending in length L and defining a circular section of radius R with respect to a plane orthogonal to the main axis A.

Alternatively, the cylindrical body 110 may extend in length and have a semi-circular section, wherein a first section of the semi-circular section has a circular shape with radius, and a second section distinct and consecutive from the first section may have a rectilinear shape or a curved shape having a radius different from the radius of the first section. The second section, if rectilinear or semi-rectilinear, extends substantially along the entire length L of the winding body to define a substantially rectangular plane.

In a further embodiment, the winding body extends in length and defines a polygonal, e.g. square, rectangular, pentagonal, hexagonal, or octagonal cross-section relative to the main axis A.

The winding body 110 has, according to any of the previously described embodiments, a length of between 4 cm and 25 cm, in particular between 6 cm and 20 cm. Note that the extension in length of the winding body is essentially defined by a standard length of a straw.

In addition, the winding body 110 has a maximum radial dimension between 5 mm and 15 mm, more particularly between 6 mm and 11 mm, more particularly between 7 mm and 10 mm. In the case where the winding body is circular, the maximum radial dimension is defined by the diameter of the winding body orthogonally to the main axis A. Alternatively, if the winding body has a polygonal shape, the maximum radial dimension is defined by the envelope of the vertices of the polygon. In general terms, the maximum radial envelope essentially defines the radial envelope of the straw 50. In cases where the winding body is semicircular or polygonal in shape, the diameter of the straw may be slightly smaller than the maximum radial footprint.

The winding body can be made of metal material, for example steel, stainless steel or chrome-plated metal. Alternatively, the winding body can be made of polymer material. In addition, the winding body 110 can be made of composite material, e.g. metal and polymer material or glass or carbon fibre mixed with epoxy resin.

The winding body of the present invention is fixed in rotation, particularly during an operating condition of the apparatus for making the straw 50.

The winding body 110 is also fixed in translation, in particular along the main axis A and along an axis orthogonal to the main axis A, during an operating condition of the apparatus for making the straw 50.

The winding body 110 is at least partially inserted in the exit opening of the conveyor, such that a portion of the winding body is inside the conveyor, and a portion is outside the conveyor 130. In particular, the first end portion is arranged upstream of the passage section of the conveyor 130 according to the winding direction WD, while the second end portion is arranged downstream of the conveyor 130 according to the winding direction WD and spaced from the through opening 140. In detail, the first end portion is arranged between the first and second side walls 160, 170 of the conveyor 130. It should also be noted that the majority of the winding body extends outside the conveyor such that if the first end portion is placed at a distance P1 relative to the exit portion of the conveyor 130, and the second end portion is placed at a distance P2 relative to the exit portion of the conveyor 130, then P2>P1: in particular P2 may be at least twice or three times as large as P1.

As the winding body 110 is inserted into the conveyor and extends along the winding axis WD, the cylindrical body 5 exiting the conveyor is wrapped around the winding body.

It should also be noted that the passage opening of the conveyor 130 has a larger dimension than the radial dimension of the winding body 110, in order to allow the winding body to be inserted within the passage opening and to allow the strip material 1a or the discrete sheet to be interposed between the conveyor and the winding body.

In other words, during a winding phase, the strip 1a or the discrete sheet 1b passes through the winding conveyor 130, wraps around the winding axis during this crossing along the winding direction, transits between the winding conveyor 130 and the winding body 110, and exits the winding conveyor 130 at the exit portion 130b wrapped around the winding body 110 to define the cylindrical body 5.

The winding body 110 may be removed from the conveyor 130 during an apparatus maintenance condition: in particular, the winding body 110 may be removed by pulling it out of the through opening 140.

The apparatus 200 further comprises the constraining station 201 configured to constrain the first end portion 2 with the second end portion 3 at the mutual overlapping portion 4. The constraining station 201 is located downstream of the conveyor 130 with respect to the winding direction or advancement direction.

The constraining station 201 may include a heat-sealing element 910 configured to contact at least a portion of the mutual overlapping portion 4, such that the mutual overlapping portion 4 is interposed between the heat-sealing element 910 and the winding body 110.

During a heat-sealing step, the heat-sealing element 910 is configured to exert a thrust on the mutual coupling portion 4 when the latter is interposed between the heat-sealing element and the winding body. More specifically, the heat-sealing element is a rotatable component configured to allow advancement of the cylindrical body 5 along the main axis of the winding body during said constraining step.

The rotatable component may comprise at least one drive roller 910, as shown in FIGS. 5-9, rotatable about a rotation axis and comprising an external surface facing an external surface of the winding body 110. The rotation axis of the drive roller is preferably fixed in position and orthogonal to the main axis of the winding body. The external surface of the drive roller 910 is configured for directly abutting against the mutual overlap portion 4 of the cylindrical body 5 during a constraining step thereof: in particular the mutual overlapping portion 4 of the cylindrical body 5 is interposed between the external surface of the drive roller 910 and the external surface of the winding body 110 during the constraining step. The attached FIGS. 5-9 show a configuration wherein the constraining station 201 comprises a single drive roller 910 facing the winding body 110. Notably, in order to increase the dimension of the contact zone between the drive roller 910 and the winding body 110, the external surface of the winding body comprises a flatten surface extending along the main axis, so that the flatten surface faces the external surface of the drive roller of the constraining station 201.

The drive roller 910 is configured to:
contact and push on the mutual overlap portion 4 of the cylindrical body 5 made of paper material during an operating condition of the apparatus;
allow or determine the advancement of the paper material along the main or winding direction;
optionally heat the adhesive material on the mutual overlap portion, in particular the drive roller defining a heat-sealing element.

Figure 12:
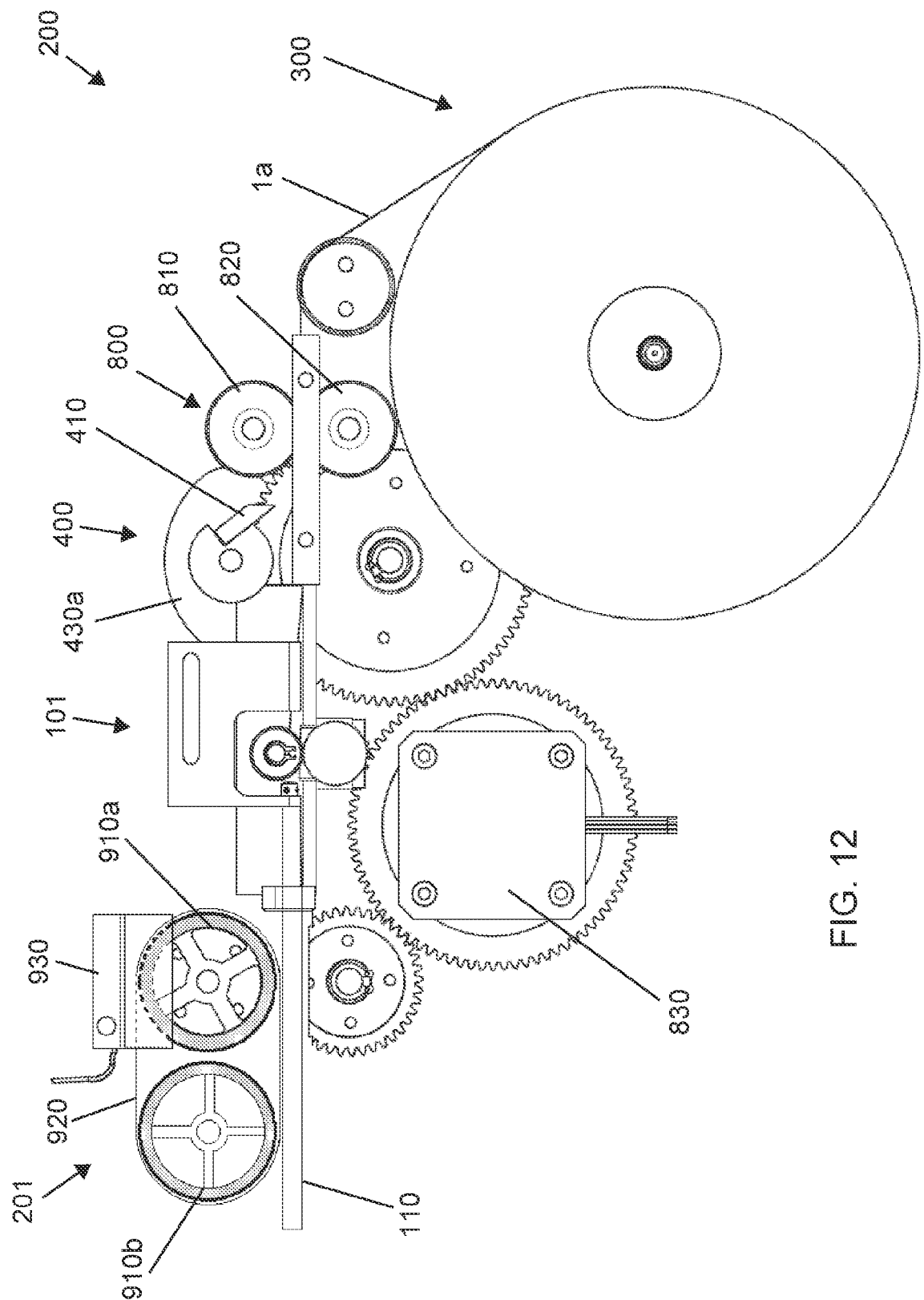
FIG. 12 is a side view of an apparatus for making straws according to the further embodiment of the present invention, wherein the constraining station comprises a loop belt.

In a configuration alternative to the drive roller 910, the constraining station 201 may comprise a first drive roller 910a rotatable about a rotation axis, a second drive roller 910b rotatable about a respective rotation axis, and a loop belt 920 wrapped around the external surfaces of the first drive roller 910a and of the second drive roller 910b, as shown in FIG. 12. The loop belt is rotatable around the first drive roller 910a and the second drive roller 910b defining an abutting plane facing an external surface of the winding body 110: thus the loop belt 920 is interposed between the winding body 110 and the first and second drive rollers 910a, 910b. The abutting plane of the loop belt is configured to abut against the mutual overlap portion 4 during a constraining step of the cylindrical body 5, so that the mutual overlapping portion 4 of the cylindrical body 5 is interposed between the abutting plane and the external surface of the winding body 110 during the constraining step. The abutting plane is substantially flat. Notably, the winding body 110 may comprise the flat external surface in the configuration wherein the constraining station 201 comprises the loop belt, so that the external surface of the loop belt faces the flat external surface of the winding body 110.

The rotation axis of the first drive roller 910a and the rotation axis of the second drive roller 910b are preferably transversal, in particular orthogonal, to the main axis A of the winding body 11: the rotational axis of the first drive roller 910a and the rotation axis of the second drive roller 910b are also fixed in position.

The constraining station 201 may further comprise a heating system 930 configured to heat up either the at least one drive roller 910 of the constraining station 201 or the loop belt 920 up to a constraining temperature for constraining the first end portion 2 with the second end portion 3 of the cylindrical body 5. The constraining temperature may be comprised between 50/60° C. and 150/200° C.

The heating system 930 may comprise an electric heating system, for example an electric resistance or an electric inductor. For example, the heating system may heat up the drive roller or the loop belt by heat convection.

The drive roller 910 and the loop belt 920 of the constraining station 201 may comprise a metallic material, for example arranged at the external surface of the drive roller 910 or of the loop belt 920, in order to promote heat transfer to the strip 1a or discrete sheet 1b to determine heat sealing. The metallic material may comprise one between steel, aluminum, copper, and brass.

The electric motor 830 of the advancement system may be operatively connected to the drive roller 910 of the constraining station 201 and configured to drive the drive roller 910 through a kinematic chain: thus the drive roller 910 is able both to advance the cylindrical body 5 along the main axis of the winding body and to constrain the mutual overlapping portion 4.

Alternatively, the electric motor 830 of the advancement system may be operatively connected to the drive belt 920 of the constraining station 201 and configured to drive the belt 920 through a kinematic chain: thus the loop belt 920 is able both to advance the cylindrical body 5 along the main axis of the winding body and to constrain the mutual overlapping portion 4.

In the above configuration, the rotatable component of the constraining station 201, namely the drive roller 910 or the loop belt 920, defines a downstream advancement system 900 configured to determine advancement of the strip or discrete sheet. In other terms, the drive roller 910 or the loop belt 920 of the constraining station 200 may advance the cylindrical body 5 as the downstream advancement system 90 of the first embodiment.

In particular, the electric motor 830 may be operatively connected through a kinematic chain to both the upstream advancement system 800 and to the rotatable element of the constraining station 201, namely to one between the drive roller 910 and the loop belt 920, so that an angular rotation of the electric motor determines a simultaneous rotation of the upstream advancement system 800 and of the rotatable element of the constraining station 201. Alternatively, the upstream advancement system 800 and the rotatable element of the constraining station 201 may be driven by distinct electric motors.

The advancement system may further comprise an auxiliary advancement system 950 configured to determine, or to contribute to, the advancement of the strip 1a or of the discrete sheet 1b along the advancement direction AD, in particular through the conveyor 130 of the forming station 101. The auxiliary advancement system comprises a first and second rollers 950a, 950b facing each other and configured to allow the strip or the discrete sheet to pass in between. In particular, an external surface of the first roller 950a of the auxiliary advancement system 950 faces an external surface of the second roller 950b of the auxiliary advancement system 950, wherein the first and second rollers 950a, 950b are opposite each other with respect to an advancement plane of the strip 1a or of the discrete sheet 1b. Thus, the first and second rollers 950a, 950b of the auxiliary advancement system 950 are counter-rotating with respect to each other to allow advancement of the strip or discrete sheet. The sheet material is configured for being interposed between the first and the second rollers 950a, 950b of the auxiliary advancement system 950 during an operating condition of the apparatus.

The auxiliary advancement system 950 is arranged at the forming station 101 or between the cutting station 400 and the conveyor 130. In particular, when arranged at the forming station 101, a rotating axis of at least one between the first and second rollers 950a, 950b of the auxiliary advancement system 950 intersects the conveyor 130, in particular intersects at least one between the first and the second lateral walls of the conveyor 130. In this configuration, at least one between the first and second rollers 950a, 950b of the auxiliary advancement system 950 is interposed between the first and the second lateral walls of the conveyor 130 and interposed between the inlet portion 130a and the outlet portion 130b of the conveyor 130. More generally, the auxiliary advancement system 950 is interposed between the upstream advancement system 800 and the downstream advancement system 900.

In the configuration shown in FIGS. 5-9, the electric motor 830 is operatively connected through a kinematic chain to the upstream advancement system 800, the downstream advancement system 900 and the auxiliary advancement system 950. In the configuration shown in FIGS. 5-9, the electric motor 830 is operatively connected through a kinematic chain to the upstream advancement system 800, the auxiliary advancement system 950 and to the at least one rotatable component of the constraining station 201, wherein the at least one rotatable component comprises the drive roller 910 or the loop belt 920.

The apparatus may further comprise a cutting station 40 comprising at least one cutting tool between a rotating or translating blade 410 and configured to define a cut on at least a portion of the strip 1a or discrete sheet 1b. The cut may be transverse, for example perpendicular, with respect to the feeding direction or the winding direction WD of the strip 1a. In particular, the cut direction may be orthogonal to the main axis A of the winding body 110.

Generally, the cutting station 400 is arranged upstream of the forming station 101: in this configuration a discrete sheet cut out from a strip is advanced towards the conveyor 130 for winding around the winding body 110. In particular the cutting station 400 may be interposed between the upstream advancement system 800 and the conveyor 130 of the forming station 101. More in detail, the cutting station 400 may be interposed between the upstream advancement system 800 and the auxiliary advancement system 950. The cutting tool 410 of the cutting station 400 comprises a rotating or a translating blade: the configuration and the detailed features of the cutting station 400 comprising the translating blade have been already described according to the first embodiment.

The rotating blade 410 is rotatable about a cutting rotation axis CR transversal, optionally orthogonal, to the first direction of the strip or discrete sheet, in particular transversal or orthogonal to the advancement direction of the paper material. The rotating blade 410 includes a cutting edge 410a extending widthwise between the first end portion 2 and the second end portion 3 of the strip 1a or of the discrete sheet 1b: in other terms the cutting edge 410a covers the entire width of the paper material. The shape of the cutting edge 410a may be substantially straight, curved. The cutting edge 410a may be parallel to the cutting rotation axis CR. The cutting edge, at least at an angular position of the rotating blade, intersects the advancement plane of the strip 1a or discrete sheet 1b, so that during an operating condition the cutting edge 410a hits and cuts the paper material.

During a rotation of the rotating blade 410, the cutting edge 410a moves also with respect to the paper material: in particular a rotation of the rotating blade 410 causes the cutting edge 410a to move towards and away from the advancement plane of the strip 1a or discrete sheet 1b. Notably, the rotating blade 410 is configured to perform full rotations around the cutting rotation axis.

The cutting tool 410 may comprises a roller bearing, on an external surface of the roller, the rotating blade 410: thus the cutting edge 410a of the rotating blade 410 is distanced from the cutting rotation axis CR in particular by a distance D comprised between 20/30 mm and 80/100 mm.

In the configuration shown in FIGS. 5-9, the electric motor 830 is operatively connected through a kinematic chain to the cutting station 400, and in particular operatively connected to the rotating blade 410. A rotation of the electric motor 830 determines a simultaneous rotation of the rotating blade.

According to a specific configuration shown in the attached FIGS. 5-9, the electric motor 830 is operatively connected through a kinematic chain to the cutting station 400, the advancement system and the constraining station 201. In particular the electric motor 830 is operatively connected through a kinematic chain to the rotating blade of the cutting station 400, the advancement rollers of the upstream advancement system 800 and the drive roller 910 or loop belt 920 of the constraining station 201: in this configuration, a rotation of the electric motor 830 determines a simultaneous movement of the cutting station, the advancement system and the constraining station. As the cutting station 400, the advancement system and the constraining station 201 are kinematically engaged each other, during a manufacturing procedure 1000 of the straw the cutting station 400, the advancement system and the constraining station 201 move together in a synchronized manner.

In more detail, and according to the specific configuration of the apparatus 200 of FIGS. 5-9, the electric motor 830 is operatively connected through a kinematic chain to the cutting station 400, the upper advancement system 800, the auxiliary advancement system 950 and the constraining station 201.

In a configuration, the kinematic chain interposed between the cutting station 400 and the electric motor 830 may be configured to define a variable transmission ratio, so as the transmission ratio varies as a function of the angular position of one between the electric motor and the rotating blade 410. Thus, during an operating condition of the apparatus 200 and set an angular speed of the electric motor 830, an angular speed of the rotating blade 410 variates during a revolution of the rotating blade.

In particular, the kinematic chain is configured so that the angular speed of the blade 41 is maximum at an angular position where the blade 410 approaches an advancement plane of the strip 1a or discrete sheet 1b. In other terms, the variable transmission ratio allows for determining a maximum speed of the blade when the latter approaches the paper material, in order to improve cutting effectiveness of the blade.

In more detail, the transmission ratio is configured to vary as a function of the angular position of the rotating blade 410 and/or of the electric motor 830, wherein the transmission ratio varies between:
  a maximum value which corresponds, given a set rotation speed of the electric motor (830), to a substantially maximum speed of the rotating blade 410, in particular to a maximum rotational speed of the rotating blade 410, and
  a minimum value which corresponds, given a set rotation speed of the electric motor 830, to a substantially minimum speed of the rotating blade 410, in particular to a minimum rotational speed of the rotating blade 410,
  wherein the maximum value of the transmission ratio corresponds to a position of the rotating blade 410 approached to the advancement plane of the strip 1a or discrete sheet 1b. On the other hand, the minimum value of the transmission ratio corresponds to a position of the rotating blade 410 away from the advancement plane of the strip 1a or discrete sheet 1b.

The kinematic chain 430 may comprise a first gear 430a and a second gear 430b engaging the first gear 430a: the first gear 430a and the second gear 430b have both shapes that deviate from a circular shape to define the variable transmission ratio. The first gear and the second gear may have a shape in the group between an oblong shape, oval shape, elliptical shape, triangular shape and quadrangular shape. Notably the first gear 430a is equal in shape to the second gear 430b and the first gear is angularly shifted with respect to the second gear.

Alternatively, kinematic chain 430 may comprise a first pulley, a second pulley and a timing belt wrapped around the first pulley and the second pulley: the first pulley and the second pulley have both shapes that deviate from a circular shape to define the variable transmission ratio. The first pulley and the second pulley may have a shape in the group between an oblong shape, oval shape, elliptical shape, triangular shape and quadrangular shape. Notably the first pulley is equal in shape to the second pulley and the first pulley is angularly shifted with respect to the second pulley.

Although the kinematic chain between the cutting station and the electric motor 830 is variable along a revolution of the rotating blade, the cutting station is rigidly synchronized with the angular rotation of the electric motor and, therefore, with the advancement system. In particular a full revolution, namely corresponding to a rotation of 360°, of the rotating blade 410 always corresponds to a predetermined angular rotation of a roller of the advancement system, in particular to a predetermined angular rotation of a roller of the upstream advancement system 800 and/or of the auxiliary advancement system 950 and/or of the drive roller of the constraining station. In more detail, a full revolution, namely corresponding to a rotation of 360°, of the rotating blade 410 always corresponds to a predetermined angular rotation of a roller of the upstream advancement system 800, a roller of the auxiliary advancement system 950 and of the drive roller of the constraining station 201.

The apparatus 200 may also comprise an ejection system comprising at least one respective roller arranged downstream of the constraining station. In particular, the ejection system is configured to move the straw along the main axis A to cause it to be ejected from the support structure 600. Optionally, the ejection system may comprise the drive roller 910 or the loop belt 920 of the constraining station 201, which is driven by the electric motor 830 causing advancement of the straw along the winding axis out of the support structure 600.

Notably, the support structure 600 of the apparatus 200 has a through window 610 configured to allow the straw to emerge out of the support structure 600 during an ejection step.

The Manufacturing Procedure 1000

The present disclosure is also directed to a method including a manufacturing procedure 1000 comprising steps for making straws 50. The manufacturing procedure 1000 may be performed by an apparatus 100, 200 according to the previously described first and second embodiments.

The manufacturing procedure 1000 may comprise a step of providing a strip 1a or discrete sheet 1b of paper sheet material at the feeding station 30; 300 and toward the conveyor 13; 130. For example this step may comprise unwinding a paper strip 1*a* from a reel. Optionally, the step of providing the strip 1*a* or discrete sheet 1*b* may comprise rotating the reel, for example activating an electric motor operatively connected to the reel.

The manufacturing procedure 1000 may further comprise a step of determining the transit of the paper sheet material through the conveyor 13: this step determines the winding of the paper sheet material around the winding axis to define a cylindrical body 5 made of paper sheet material. The step of determining the transit of the paper sheet material through the conveyor 13 comprises the step of advancing the paper material by using an advancement system, such as one or more between the previously described upstream advancement system, the auxiliary advancement system and the downstream advancement system. The step of advancing the paper material may comprise activating the electric motor 83; 830 which drives rollers of the advancement system, thereby causing the paper material to pass through the conveyor determining in turn the winding of the paper material around the main axis of the winding body 11; 110.

The manufacturing procedure 1000 may further comprise a step of cutting the strip 1*a* at the cutting station 40; 400. The cutting step may comprise moving a cutting tool towards and away with respect to the strip 1*a*, for example moving the cutting tool linearly along a direction intersecting the strip.

Alternatively, as shown in FIGS. 5-9 related to the second embodiment, the cutting step may comprise rotating a rotating blade 410 around a rotation axis transversal, and in particular orthogonal, to the advancement direction of the strip.

The manufacturing procedure 1000 may further comprise a step of winding the paper material around the main axis of the winding body 11, 110 while the paper material passes through the conveyor 13; 130. Notably, the conveyor 13; 130 is a passive component, namely with no moving parts: thus the conveyor is not able to actively perform a making step of the manufacturing procedure. The winding step is indeed caused by the advancement of the paper material through the conveyor.

After the winding step, the manufacturing procedure comprises a constraining step performed at the constraining station 20; 201. The constraining step may comprise moving a heat-sealing element towards and away from the mutual overlapping portion 4 of the cylindrical body 5: in particular, during a heat sealing step, the procedure comprises to move the heat sealing element 21 towards and in abutment to the mutual overlapping portion 4 of the cylindrical body 5 to heat sealing the first end portion 2 with the second end portion 3 of the paper material.

Alternatively, according to both the first and the second embodiment of the apparatus, the constraining step may comprise rotating a rotatable component of the constraining station 20; 201 around a rotation axis transversal or substantially orthogonal to the main axis of the winding body 11; 110. Furthermore, the constraining step comprises a step of heating up the rotatable component, for example the drive roller 910 or the belt 920, in order to allow heat sealing of the first end portion 2 with the second end portion 3 of the paper material. The step of heating up is performed by the heating system 930.

The manufacturing procedure 1000 may further comprise a step of ejecting the straw through a window of the support structure 60; 600. The step of ejecting the straw may be performed by the advancement system, for example by activating the downstream advancement system 90; 900 and/or by rotating the drive roller of the constraining station 20; 201.

The manufacturing procedure 1000 may further comprise advancing the strip 1*a* or the discrete sheet 1*b* along the advancement direction AD, and simultaneously, constraining the first end portion 2 with the second end portion 3 of the cylindrical body 5 by activating the constraining station 20; 201. In particular, the manufacturing procedure 1000 may comprise to rotate the rollers of the advancement system and to rotate the roller or loop belt of the constraining station 20; 201 simultaneously, so that the paper material smoothly moves throughout the different station without stopping its advancement.

Furthermore, the manufacturing procedure 1000 may comprise rotating the rotating blade 410 of the cutting station 400 and, simultaneously, moving the paper material along the advancement direction.

In particular, the manufacturing procedure 1000 may comprise to perform the following steps simultaneously:
rotating the rotating blade 410 of the cutting station 400;
moving the paper material along the advancement direction;
constraining the first end portion 2 with the second end portion 3 of the paper material in particular by means of the rotatable component.
Notably, during the above steps of:
rotating the rotating blade 410 of the cutting station 400,
moving the paper material along the advancement direction, and
constraining the first end portion 2 with the second end portion 3 of the paper material, the cutting station, the forming station and the constraining station are active on different portions of a continuous strip 1*a* or a one-piece of discrete sheet 1*b*. The different portions of the continuous strip 1*a* or of the one-piece of discrete sheet 1*b* are located along the advancement direction AD set by the advancement system.

The invention claimed is:

1. Apparatus for manufacturing straws comprising a support structure supporting:
a feeding station to feed a strip or discrete sheets made of paper material along a feeding direction, said strip or discrete sheets extending:
lengthwise along a first direction parallel to or coinciding with said feeding direction, and
widthwise along a second direction orthogonal to said first direction between a first end portion and a second end portion,
a forming station comprising:
a conveyor extended lengthwise, along a winding axis, between an inlet portion receiving the strip or a discrete sheets, and an outlet portion allowing the movement of the strip or the discrete sheet exiting from said conveyor, said winding axis defining a winding direction which extends from the inlet portion to the outlet portion of the conveyor,
said conveyor further comprising:
a base extended between the inlet portion and the outlet portion of the conveyor, said base being configured for receiving in abutment the strip or the discrete sheet;
a first lateral wall and a second lateral wall, opposite each other and extended height-wise starting from said base, said first and second lateral walls converging with respect to each other along said winding direction until said first and second lateral walls meet;
a through opening situated at least at the outlet portion of the conveyor, said through opening defining a circular passage section laterally interposed between the first and the second lateral wall, and vertically interposed between said base and a top wall opposite said base;
wherein said conveyor:
receives the strip or the discrete sheet in a flat form at the inlet portion, and
winds said strip or discrete sheet around the winding axis to define a cylindrical body made of paper material, wherein the first end portion and the second end portion face each other and are superimposed to define a mutual overlap portion at the outlet portion,
a winding body extended along a main axis parallel to or coinciding with said winding axis and configured for receiving in abutment said cylindrical body, said winding body traversing said through opening of the conveyor;
a constraining station configured for constraining, during a constraining step, the first end portion with the second end portion at the mutual overlapping portion to define a straw extended between a first and a second circular free edges,
the constraining station being arranged downstream of the forming station and comprising a rotatable component configured to allow continuous advancement of the cylindrical body during said constraining step.

2. Apparatus of claim 1, wherein said rotatable component comprises a drive roller rotatable about a rotation axis and comprising an external surface facing an external surface of the winding body, the external surface of the at least one drive roller being configured for directly abutting against the mutual overlap portion of the cylindrical body during a constraining step thereof, the mutual overlap portion of the cylindrical body being interposed between the external surface of the drive roller and the external surface of the winding body during the constraining step, wherein the drive roller is a single drive roller and the rotation axis of the drive roller of the constraining station is transversal to the main axis of the winding body, said rotational axis being fixed in position.

3. Apparatus according to claim 2, wherein the constraining station comprises a heating system configured to heat up the drive roller of the constraining station configured to abut against the mutual overlapping portion of the cylindrical body up to a constraining temperature for constraining the first end portion with the second end portion of the cylindrical body.

4. Apparatus according to claim 3, wherein the heating system comprises an electric heating system including an electric resistance or an electric inductor,
and wherein the drive roller of the constraining station comprises a heatable material heated by the heating system, wherein the external surface of the drive roller is made of a metallic material and the constraining temperature is comprised between 50° C. and 150° C.

5. Apparatus according to claim 2, further comprising an advancement system to move the rotatable component advancing the cylindrical body during the constraining step and advancing the strip or the discrete sheet through the forming station along an advancement direction,
said advancement system comprising an advancement roller and an electric motor operatively connected to the advancement roller, the electric motor being configured to rotate the advancement roller to determine the advancement of the strip or of the discrete sheet along said advancement direction, wherein the electric motor is operatively connected to the drive roller of the constraining station and configured to drive the drive roller through a kinematic chain, said drive roller being configured both to advance the cylindrical body along the main axis of the winding body and to constrain the mutual overlapping portion.

6. Apparatus of claim 1, wherein said rotatable component comprises a first drive roller rotatable about a rotation axis, a second drive roller rotatable about a respective rotation axis, and a loop belt wrapped around external surfaces of the first drive roller and of the second drive roller, the loop belt being rotatable around the first drive roller and the second drive roller defining an abutting area facing an external surface of the winding body to abut against the mutual overlap portion during a constraining step of the cylindrical body, wherein the loop belt is interposed between the winding body and the first and second drive rollers,
the mutual overlapping portion of the cylindrical body being interposed between said abutting area and the external surface of the winding body during the constraining step,
said abutting area being flat,
wherein the rotation axis of the first drive roller and the rotation axis of the second drive roller are transversal to the main axis of the winding body, said rotational axis of the first drive roller and said rotation axis of the second drive roller being fixed in position.

7. Apparatus according to claim 1, further comprising an advancement system to move the rotatable component advancing the cylindrical body during the constraining step and advancing the strip or the discrete sheet through the forming station along an advancement direction,
said advancement system comprising an advancement roller and an electric motor operatively connected to the advancement roller, the electric motor being configured to rotate the advancement roller to determine the advancement of the strip or of the discrete sheet along said advancement direction.

8. Apparatus according to claim 7, further comprising a control unit configured for performing a manufacturing procedure for making the straw, said manufacturing procedure comprising the following steps:
advancing the strip or the discrete sheet along the advancement direction by commanding the electric motor to drive the advancement roller of the advancement system, and simultaneously with advancing the strip or the discrete sheet,
constraining the first end portion with the second end portion of the cylindrical body by activating the constraining station, wherein the step of activating the constraining station comprises activating the heating system of the constraining station for thermo-welding the first end portion with the second end portion,
wherein the advancing step is simultaneous to the constraining step,
wherein the electric motor is configured to rotate the advancement roller continuously during the constraining step.

9. Apparatus of claim 8, wherein the manufacturing procedure comprises commanding the electric motor by activating rotation of the electric motor, wherein rotation of the electric motor determines, along the entire duration of the manufacturing procedure, a simultaneous rotation:

of the rotatable component of the constraining station to move the cylindrical body along the main axis of the winding body; and of the advancement roller of the advancement system, wherein the advancement roller is arranged at:
an upstream advancement system of the advancement system arranged upstream of the forming station and the cutting station; or
an auxiliary advancement system arranged at the forming station;

of a cutting blade of the cutting station, wherein during the manufacturing procedure the rotatable component of the constraining station, the at least one advancement roller of the advancement system and the cutting blade of the cutting station rotate simultaneously in a continuous manner.

10. Apparatus according to claim 7, wherein the advancement system comprises an upstream advancement system arranged upstream of the conveyor with respect to the advancement direction, the upstream advancement system comprising one or more rollers configured to advance the strip or the discrete sheet along the advancement direction,
the electric motor of the advancement system being operatively connected to both the upstream advancement system and to the rotatable component of the constraining station through a kinematic chain,
wherein the upstream advancement system is interposed between the feeding station and a cutting station.

11. Apparatus according to claim 7, wherein the advancement system comprises an auxiliary advancement system configured to contribute to the advancement of the strip or of the discrete sheet along the advancement direction,
the auxiliary advancement system being arranged at the forming station or between a cutting station and the conveyor,
the auxiliary advancement system comprising a respective first and second rollers facing each other and configured to allow the strip or the discrete sheet to pass in between,
wherein an external surface of the first roller of the auxiliary advancement system faces an external surface of the second roller of the auxiliary advancement system,
and wherein the first and second rollers of the auxiliary advancement system are counter-rotating with respect to each other,
the sheet material being interposed between said first and second rollers of the auxiliary advancement system during an operating condition of the apparatus,
the first and second rollers being opposite each other with respect to an advancement plane of the strip or of the discrete sheet.

12. Apparatus according to claim 11, wherein a rotating axis of either the first roller or the second roller of the auxiliary advancement system intersects at least one between the first and the second lateral walls of the conveyor,
and wherein at least one between the first and second rollers of the auxiliary advancement system is interposed between the first and the second lateral walls of the conveyor.

13. Apparatus according to claim 7, wherein the electric motor is operatively connected through a kinematic chain to the upstream advancement system, the auxiliary advancement system and to the rotatable component of the constraining station, wherein the rotatable component comprises a drive roller.

14. Apparatus of claim 7, wherein a cutting station is rigidly synchronized with the advancement system through a kinematic chain, wherein the cutting station, the advancement system and the constraining station are rigidly synchronized with each other through the kinematic chain,
wherein said kinematic chain is configured to determine simultaneous movement of the cutting station, the advancement system and the constraining station.

15. Apparatus according to claim 1, further comprising a cutting station with a cutting tool, wherein the cutting station is arranged upstream of the forming station and is interposed between the upstream advancement system and the conveyor of the forming station,
wherein the cutting tool comprises a rotating or a translating blade, said cutting station making a cut on a portion of the strip or discrete sheet, said cut being transverse with respect to the feeding direction or to the winding direction.

16. Apparatus according to claim 15, wherein the cutting tool of the cutting station comprises a rotating blade including a cutting edge extending widthwise between the first end portion and the second end portion of the strip or of the discrete sheet,
said rotating blade being rotatable about a cutting rotation axis transversal to the advancement direction of the strip or discrete sheet,
said cutting edge being parallel to the cutting rotation axis.

17. Apparatus according to claim 16, further comprising a kinematic system connecting an electric motor of the advancement system to the rotating blade, said kinematic system defining a variable transmission ratio between the electric motor of the advancement system and the rotating blade of the cutting station,
said transmission ratio is configured to vary as a function of the angular position of the rotating blade and/or of the electric motor,
wherein said transmission ratio is configured to vary between:
a maximum value which corresponds, given a set rotation speed of the electric motor, to a maximum rotational speed of the rotating blade, and
a minimum value which corresponds, given a set rotation speed of the electric motor, to a minimum rotational speed of the rotating blade,
wherein the maximum value of the transmission ratio corresponds to a position of the rotating blade approached to an advancement plane of the strip or discrete sheet during an operating condition of the apparatus.

18. Apparatus according to claim 17, wherein the kinematic system comprises a first gear and a second gear engaging the first gear which define said variable transmission ratio, and wherein the first gear and the second gear have both shapes that deviate from a circular shape.

19. Apparatus according to claim 18, wherein the first gear is equal in shape to the second gear and wherein the first gear is angularly shifted with respect to the second gear, the first gear and the second gear having a shape in the group between an oblong shape, oval shape, elliptical shape, triangular shape and quadrangular shape.

20. Apparatus according to claim 17, wherein the kinematic system comprises a first pulley, a second pulley and a timing belt wrapped around the first pulley and the second pulley defining said variable transmission ratio, and wherein the first pulley and the second pulley have both shapes that deviate from a circular shape.

21. Apparatus according to claim 20, wherein the first pulley is equal in shape to the second pulley and wherein the first pulley is angularly shifted with respect to the second pulley, the first pulley and the second pulley have a shape in the group between an oblong shape, oval shape, elliptical shape, triangular shape and quadrangular shape.

\* \* \* \* \*